US011801596B2

(12) United States Patent
Moisè et al.

(10) Patent No.: US 11,801,596 B2
(45) Date of Patent: Oct. 31, 2023

(54) SYSTEM FOR ASSISTING AN OPERATOR IN EXERTING EFFORTS

(71) Applicant: IUVO S.R.L, Pontedera (IT)

(72) Inventors: Matteo Moisè, Ponte Buggianese (IT); Luca Morelli, Leghorn (IT); Francesco Giovacchini, Pisa (IT); Nicola Vitiello, Pontedera (IT); Giuseppe Colombina, Nova Milanese (IT)

(73) Assignee: IUVO S.R.L, Pontedera (IT)

( * ) Notice: Subject to any disclaimer, the term of this patent is extended or adjusted under 35 U.S.C. 154(b) by 701 days.

(21) Appl. No.: 16/631,226

(22) PCT Filed: Jun. 19, 2018

(86) PCT No.: PCT/IB2018/054513
§ 371 (c)(1),
(2) Date: Jan. 15, 2020

(87) PCT Pub. No.: WO2019/016629
PCT Pub. Date: Jan. 24, 2019

(65) Prior Publication Data
US 2020/0139537 A1    May 7, 2020

(30) Foreign Application Priority Data
Jul. 18, 2017   (IT) .................. 102017000081177

(51) Int. Cl.
*B25J 9/00* (2006.01)
*A61H 3/00* (2006.01)
(Continued)

(52) U.S. Cl.
CPC .............. *B25J 9/0006* (2013.01); *A61H 3/00* (2013.01); *A61H 1/024* (2013.01); *A61H 1/0281* (2013.01);
(Continued)

(58) Field of Classification Search
CPC ....... B25J 9/0006; B25J 19/0016; A61H 3/00; A61H 1/024; A61H 1/0281; A61H 2201/165
See application file for complete search history.

(56) References Cited

U.S. PATENT DOCUMENTS 6,425,393 B1 *  7/2002  Lurie ................. A61M 16/0084
                                                   128/202.28
10,040,207 B1 *  8/2018  Cheng .................. B25J 19/0012
(Continued)

FOREIGN PATENT DOCUMENTS

CN   101691036 A   4/2010
CN   104245250 A   12/2014
(Continued)

OTHER PUBLICATIONS

Hain, "The Spring Balance of Loads," Basics of Agricultural Engineering, Issue 3, 1952, pp. 38-50.
(Continued)

*Primary Examiner* — Valerie L Woodward
(74) *Attorney, Agent, or Firm* — WORKMAN NYDEGGER

(57) ABSTRACT

A system for assisting an operator in exerting efforts comprises a garment that can be worn by the operator, which is to engage, when worn, the mutually mobile parts of a joint of the operator. The system defines at least one axis of rotation that is to assume a position corresponding to the joint of the operator. A device is carried by the garment and designed to operate so as to compensate the resistive moments that act on the joint during the effort exerted by the operator. A compensation device is provided equipped with a rotational assembly, which has a neutral position and is able to determine a pre-set plot of the assisting torque that is a function of the angle of rotation of the joint. The
(Continued)

compensation device may include a tension regulation device to regulate a moment obtained about the joint of the operator.

18 Claims, 17 Drawing Sheets

(51) Int. Cl.
    *A61H 1/02*        (2006.01)
    *B25J 19/00*       (2006.01)

(52) U.S. Cl.
    CPC ..... *A61H 2201/165* (2013.01); *B25J 19/0016* (2013.01)

(56) References Cited

U.S. PATENT DOCUMENTS

| | | | |
|---|---|---|---|
| 2012/0184880 A1 | 7/2012 | Doyle | |
| 2015/0040712 A1 | 2/2015 | Yamaguchi | |
| 2016/0368151 A1* | 12/2016 | Han | B25J 19/0016 |

FOREIGN PATENT DOCUMENTS

| | | | | |
|---|---|---|---|---|
| CN | 204997660 U | 1/2016 | | |
| EP | 2948276 A2 | 12/2015 | | |
| RU | 2362598 C2 | 7/2009 | | |
| RU | 157130 U1 | 11/2015 | | |
| WO | WO-2004096905 A2 * | 11/2004 | .......... | B25J 19/0016 |
| WO | 2012099995 A2 | 7/2012 | | |
| WO | 2014125387 A2 | 8/2014 | | |
| WO | WO-2014125387 A2 * | 8/2014 | ............ | B25J 9/0006 |
| WO | 2016065350 A1 | 4/2016 | | |
| WO | 2019016629 A1 | 1/2019 | | |

OTHER PUBLICATIONS

"Shock Absorber Specifications: 7610 Series & 76 Series Shock Absorber Springs," Ikon Suspension, Jun. 23, 2005, 1 Pages.
Italian Search Report and Written Opinion from IT Application No. IT 201700081177, dated Jun. 8, 2018.
International Search Report and Written Opinion from PCT Application No. PCT/IB2018/054513, dated Oct. 12, 2018.
International Search Report and Written Opinion from PCT Application No. PCT/IB2020/053821, dated Jun. 30, 2020.
Chinese Office Action in corresponding Chinese Application No. 201880047630.0, dated Jul. 5, 2022.
Search Report from corresponding RU Application No. 2020101474/05, dated Oct. 8, 2020.
Office Action from corresponding RU Application No. 2020101474/05, dated Oct. 9, 2020.

* cited by examiner

SYSTEM FOR ASSISTING AN OPERATOR IN EXERTING EFFORTS

FIELD OF ART

The system relates to passive assistive exoskeletons arranged to reduce the physical effort of operators.

BACKGROUND

The disclosure relates to a system for assisting an operator in exerting efforts, of the system comprising a garment that can be worn by the operator, and which is configured to engage, when worn, the mutually mobile parts of a joint of the operator and which defines at least one axis of rotation to assume a position corresponding to the joint of the operator; and a device carried by the garment and designed to operate to compensate the resistive moments that act on the joint during the effort exerted by the operator.

A device of the type referred to is described in the document No. WO2012/099995A2.

The known system referred to is designed for vertical support of the arms of an operator to assist him in tasks to be performed in positions where his arms are raised.

For this purpose, the system of the disclosure comprises supports for the arms, and elastic means coupled thereto and operating for partially compensating the force of gravity acting on the operator's arms. The system comprises articulated joints, which connect the supports of the arms to the harness worn on the torso of the operator to allow an—albeit limited—freedom of movement for the arms, more particularly at the shoulder joints.

SUMMARY

Embodiments of the system of the disclosure relate to a passive exoskeleton for relieving a load on a joint, for example, a shoulder, and for providing assistive effort. The object of the present disclosure is to provide an improvement over the prior art solution discussed above, in particular from the standpoints of ergonomics and convenience of use.

Specifically, the embodiments of the system rely on the principle of a passive assistive exoskeleton having an elastic mechanism arranged to generate a torque proportional to the elevational angle of a joint, such as an operator's arm. According to the embodiments, the elastic mechanism is configured to modify a distance between two extremities of the elastic mechanism to pre-tension the elastic mechanism among a plurality of predetermined tension settings, and as a consequence a level of assistance provided by the exoskeleton. As an example, the elastic mechanism may be spring-based including at least one elastic spring element.

According to an embodiment, a system for assisting an operator in exerting efforts comprises a garment that can be worn by the operator, which engages, when worn, the mutually mobile parts of a joint of the operator, and has a mobile frame that defines at least one axis of rotation, which assumes a position corresponding to the joint of the operator; and a compensation device carried by the garment and operable to compensate resistive moments acting on the joint during the effort exerted by the operator.

The compensation device comprises a first rotatable member and a second rotatable member, which are connected together and are brought into relative motion about a first axis of rotation because of the movement of the joint of the operator's body, wherein the second rotatable member can rotate about a second axis of rotation; and an elastic mechanism having at least one elastic element, arranged for acting on the second rotatable member to impart on the first axis of rotation a moment opposite to the resistive moments. The first and second rotatable members and the elastic mechanism are mutually prearranged in such a way that, in at least one pre-set position of the joint, the force exerted by the elastic mechanism on the second rotatable member is oriented in a direction incident to the second axis of rotation of the second rotatable member.

The mobile frame may comprise a first portion and a second portion which are mutually mobile about the first axis of rotation.

The first rotatable member may be a gear wheel, fixedly mounted on the first portion and aligned with the first axis of rotation. The second rotatable member is a gear wheel, fixedly mounted on the second portion, and rotatable about the second axis of rotation and mobile according to a motion of revolution about the axis of rotation. The elastic mechanism engages the second rotatable member, exerting a linear force on an eccentric point of the second rotatable member.

In another embodiment of the system of the disclosure, the compensation device may include an epicyclic gear train mounted at the first axis of rotation and prearranged so a crown wheel of the gear train is fixedly mounted on the second portion and a central gear wheel of the gear train is fixedly mounted on the first portion, or vice versa. The crown wheel or gear wheel define the first gear member or a third gear member. The second rotatable member may include a planetary-gear carrier. The elastic assembly engages the planetary-gear carrier, exerting a linear force on an eccentric point thereof.

The elastic mechanism may comprise a battery of springs such that a second end of the elastic mechanism is adjustable for setting the pre-tensioning of the elastic mechanism. The battery of springs may be connected to first and second brackets, wherein the first bracket is mounted on the eccentric point of the second rotatable member, and a second bracket is mounted on the second portion.

A tension regulation device may be connected and adapted to regulate tension in the elastic mechanism. The tension regulation device is arranged for pre-tensioning the elastic mechanism at a plurality of discrete tension settings, and for placing the pre-tension at one of the plurality of discrete tension settings. The tension regulation device may include a cam assembly for adjusting the elastic mechanism at the plurality of discrete tension settings. The tension regulation device may include an interface mechanism allowing the operator to selectively adjust the compensation device.

The system may be designed for a shoulder joint of the operator, wherein the pre-set position corresponds to a position of the arm extending along the operator's side. The first and second rotatable members may define a motion-transmission ratio defined because the elastic mechanism determines, on the first axis of rotation, a maximum moment in the position of the arm projected forwards at 90°. The first and second rotatable members may have a transmission ratio that is variable as a function of the angle of rotation about the first axis of rotation.

The garment may comprise a portion designed to engage the torso of the operator, and has a linear guide on which a sliding-block assembly slides; a first articulation element, rotatably mounted on the sliding-block assembly about at least one second axis of rotation; and a second articulation element, which is rotatably mounted on the first element, about the first axis of rotation. The first articulation element may be connected to the sliding-block assembly through a joint with two degrees of freedom, which defines a second axis of rotation and a third axis of rotation, orthogonal to one another.

The system may be adapted to the hip joint of the operator, wherein the pre-set position corresponds to an upright position of the operator.

BRIEF DESCRIPTION OF THE DRAWINGS

Further characteristics and advantages of the invention will emerge clearly from the ensuing description referring to the annexed drawings, which are provided purely by way of non-limiting example and in which.

DETAILED DESCRIPTION OF VARIOUS EMBODIMENTS

Figure 1:
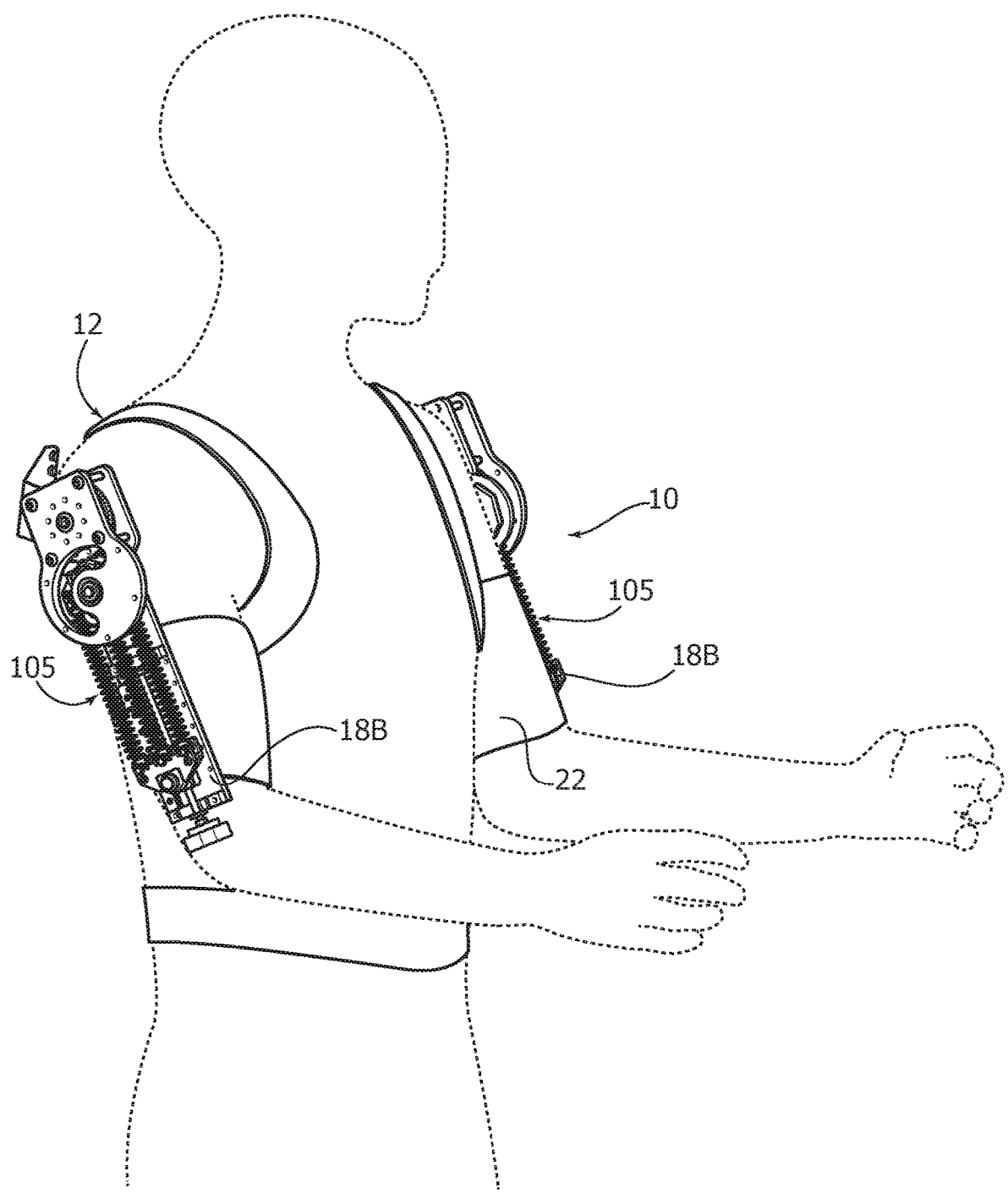
FIG. 1 illustrates the system described herein in one embodiment, worn by an operator, illustrated in a front axonometric view.

A better understanding of different embodiments of the disclosure may be had from the following description read in conjunction with the accompanying drawings in which like reference characters refer to like elements.

While the disclosure is susceptible to various modifications and alternative constructions, certain illustrative embodiments are shown in the drawings and are described below in detail. It should be understood, however, there is no intention to limit the disclosure to the specific embodiments disclosed, but on the contrary, the intention is to cover all modifications, alternative constructions, combinations, and equivalents falling within the spirit and scope of the disclosure.

The references used herein are provided merely for convenience and hence do not define the sphere of protection or the scope of the embodiments.

The system described is a system for assisting an operator in exerting efforts, of the type comprising:
  a garment that can be worn by the operator, which is to engage, when worn, the mutually mobile parts of a joint of the operator and which defines at least one axis of rotation to assume a position corresponding to the joint; and
  a device carried by the garment and designed to operate to compensate the resistive moments that act on the joint during the effort exerted by the operator.

The system described herein has been devised with reference to applications for assisting the operator in efforts involving the shoulder joint. As seen in what follows, the same principles set forth may be applied also for systems for assisting the operator in efforts involving other joint groups or other joints, such as the hip joint or the knee joint.

The system described herein is characterized in that the compensation device comprises:
  a first gear member and a second gear member, which are connected and are brought into relative motion about the aforesaid axis of rotation because of the movement of the joint of the operator's body, wherein the second gear member is rotatable about its own axis; and
  an assembly equipped with one or more elastic elements, which is prearranged for acting on the second gear member to impart on the axis of rotation a moment opposite to the resistive moments;
  wherein the first and second gear members and the assembly are mutually prearranged in such a way that, in at least one pre-set position of the joint, the force exerted by the assembly on the second member is oriented in a direction incident regarding the axis of rotation of the second member.

In the pre-set position referred to above, the aforesaid assembly cannot impart any moment of compensation on the axis of rotation of the system.

The aforesaid pre-set position hence corresponds to a neutral position of the system, in which the operator receives no impulse on the joint.

Preferably, in the application to the shoulder joint, the above-mentioned neutral position is made to correspond to the position of the arms extending along the torso. In the application to the hip joint, the neutral position is made, instead, to correspond to the upright position of the operator.

The present applicant has found that the possibility for the system to identify such a neutral position constitutes a fundamental characteristic for guaranteeing adequate comfort for the operator, above all for the person who, wearing the system, must perform a range of tasks not all linked, for example, to raising of the arms.

The system described herein is hence suited for constituting an accessory that can be worn by the operator for the entire workshift, with the convenience for the operator to put it on just once when getting dressed at the start of the shift.

Once again in the perspective of improving the comfort for the operator, in various preferred embodiments, the elastic mechanism of the system is provided with a system for adjustment of pre-tensioning of the elastic mechanism, to enable the operator to choose assistance that he desires or, possibly, to even exclude the assistance altogether, for example during a prolonged pause from the workshift.

As will be seen in what follows, in various preferred embodiments, the system described has a system of axes of movement, which can assist and follow in a precise and fluid way practically all the movements of the joint and of the possible joint group or girdle to which the joint belongs.

This system of axes of movement has proven to render the system of assistance optimal from the ergonomic standpoint, and increase further the perception of comfort by the operator.

With reference now to the figures, the system for assisting an operator in exerting efforts represented therein, designated by the reference number 10, is particularly designed in the illustrated embodiment for assisting an operator in exerting efforts involving the shoulder joint.

The system 10 comprises a garment 12, which can be worn by the operator and constitutes an item of clothing. Referring to the embodiment of FIGS. 1 to 4, the garment 12 has form and wearability like those of a jacket.

Preferably, the garment 12 is made of fabric, whether natural or synthetic, and is possibly padded in some areas, for example in the areas of the trapezius, of the arms, and/or of the sides of the operator. Once again, the garment 12 preferably englobes rigid or semi-rigid elements (e.g. plates, bars), which contact the body of the operator and, in view of this purpose, are shaped in a way corresponding to the shape of the area of the body of the operator which they are to contact. These rigid or semi-rigid elements have the function of discharging the forces generated at the assisted axis on the operator's body, on specific parts thereof such as the shoulders and the pelvis, and in a distributed way to prevent excessive pressures that might be troublesome.

Applied on the garment 12 is a mobile frame designed to define the assisted axis of rotation of the system 10 plus further degrees of freedom to follow the movements of the operator allowed by the scapular girdle, or more by the joint where the system 10 is applied.

In various preferred embodiments, as in the one illustrated in FIGS. 1-4, on its rear side, at the shoulder blades, the garment 12 carries a pair of linear guides 14, preferably oriented in respective directions and both inclined with respect to the frontal plane of the operator, to be mutually divergent forwards, and regarding a horizontal plane, to be divergent upwards, the guides substantially following the subspinatus plane of the scapula. Such linear guides 14 identify respective axes of translation Y1 and Y2. Mounted movably on each linear guide 14 is a sliding-block assembly 16, which comprises an L-shaped supporting bracket 161, contained in the same plane of the respective linear guide 14, and provided on its end with a joint 162, having two degrees of freedom, and configured for defining a first axis of rotation I1 and a second axis of rotation I2 that are orthogonal to one another.

The bracket 161 is shaped so that the joint 162 is set substantially in a position corresponding to the rear part of the shoulder of the operator.

The joint 162 connects the supporting bracket 161 to two mutually-articulated elements 18A and 18B, which identify the "assisted" axis of rotation of the system 10 described herein, designated by the reference I3.

The first element 18A is directly connected to the joint 162, regarding which it can turn about the first and second axes I1 and I2 referred to above.

In various preferred embodiments, as in the one illustrated, the joint 162 has an annular body that is rotatably mounted on a first pin 162A, which defines the first axis I1, and carries on itself two opposed radial pins 162B, which define the second axis I2. The first pin 162A is fixedly carried by the bracket 161, whereas the element 18A is rotatably mounted on the two pins 162B.

In various preferred embodiments, the joint 162 is set in a position corresponding to the gleno-humeral joint of the operator.

Even more preferably, the joint 162 is positioned to set the first axis I1 approximately orthogonal to the frontal plane of the operator in such a way that rotation of the element 18A about the first axis I1 will substantially correspond to a movement of abduction/adduction of the arm of the operator. The second axis I2 is arranged so rotation of the element 18A about it will correspond substantially to a movement of rotation of the shoulder. The element 18A extends in cantilever fashion from the joint 162 following a curvilinear profile to set its end 182 opposite to the joint, in a position corresponding to the lateral part of the operator's shoulder. Mounted in an articulated way on this end 182, about the axis of rotation I3, is the element 18B, which is fixed to a band 22 to be worn by the operator on his arm. The axis I3—in the resting condition illustrated in the FIGURES—is a substantially horizontal axis in the frontal plane of the operator. Any movement of rotation of the arm of the operator with a component in the sagittal plane (orthogonal to the frontal plane), will determine a rotation of the element 18B regarding the element 18A about the axis of rotation I3.

The axis of rotation I3 constitutes the "assisted" axis of the system, at which axis the system generates a torque that assists the efforts made by the operator. Given the orientation of the axis I3, the assistance generated can be exerted regarding a movement of antero-projection (or projection forwards) of the arm or a movement in an opposite direction. The device that can generate this action of assistance has a general constructional configuration given by:

a first gear member and a second gear member, which are connected and are brought into relative motion about the "assisted" axis of rotation because of the movement of the joint of the operator's body, wherein the second gear member can rotate about its own axis; and an assembly equipped with one or more elastic mechanism, which is prearranged for acting on the second gear member to impart on the "assisted" axis of rotation a moment opposite to the resistive moments;

wherein the first and second gear members and the "elastic" assembly are mutually prearranged in such a way that, in at least one pre-set position of the joint, the force exerted by the aforesaid assembly on the second member is oriented in a direction incident regarding the axis of rotation of the second member.

Figure 5A:
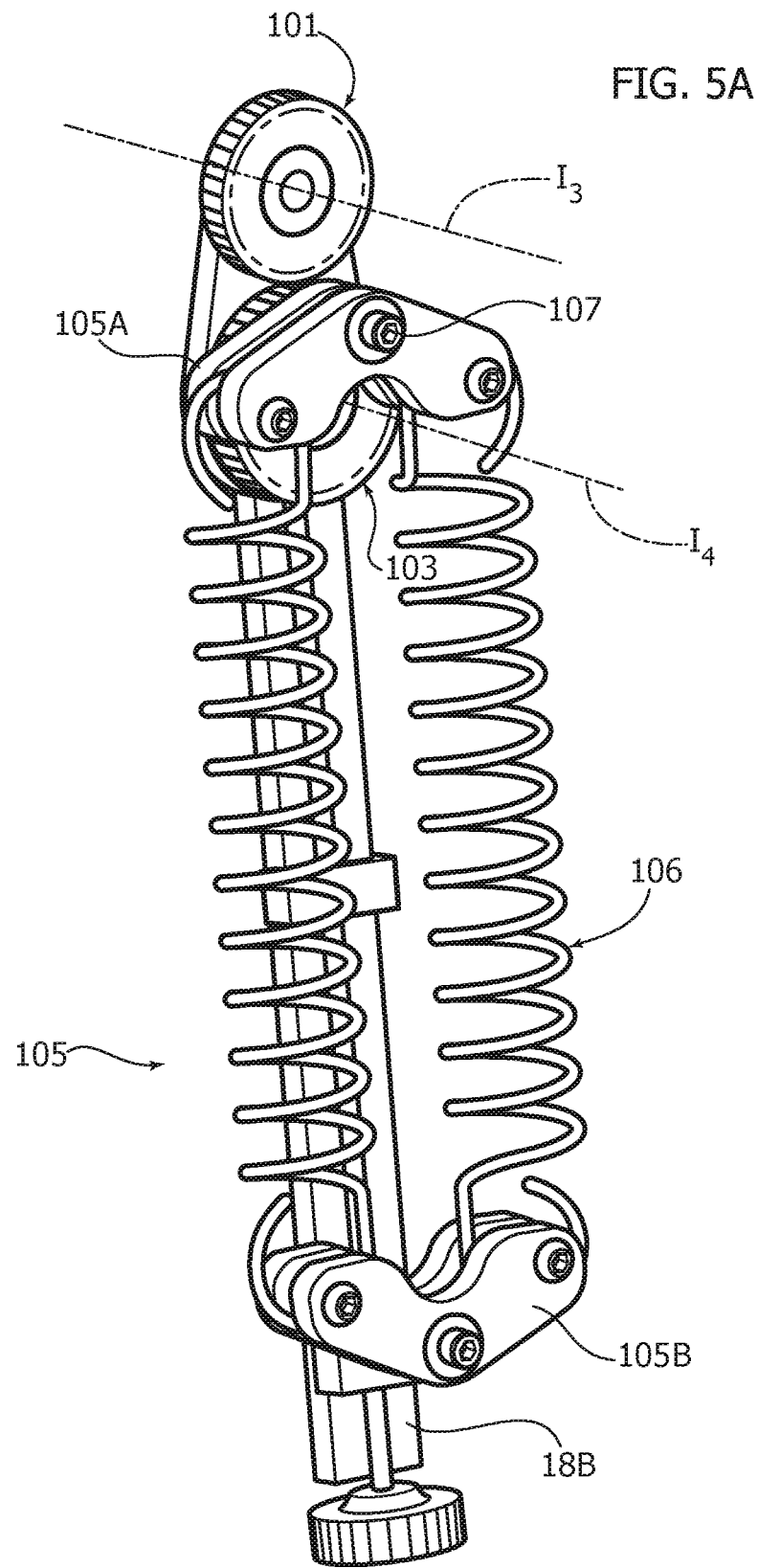
FIG. 5A illustrates internally, in an axonometric view, the compensation device of the system of FIG. 1 according to a first embodiment.
Figure 5B:
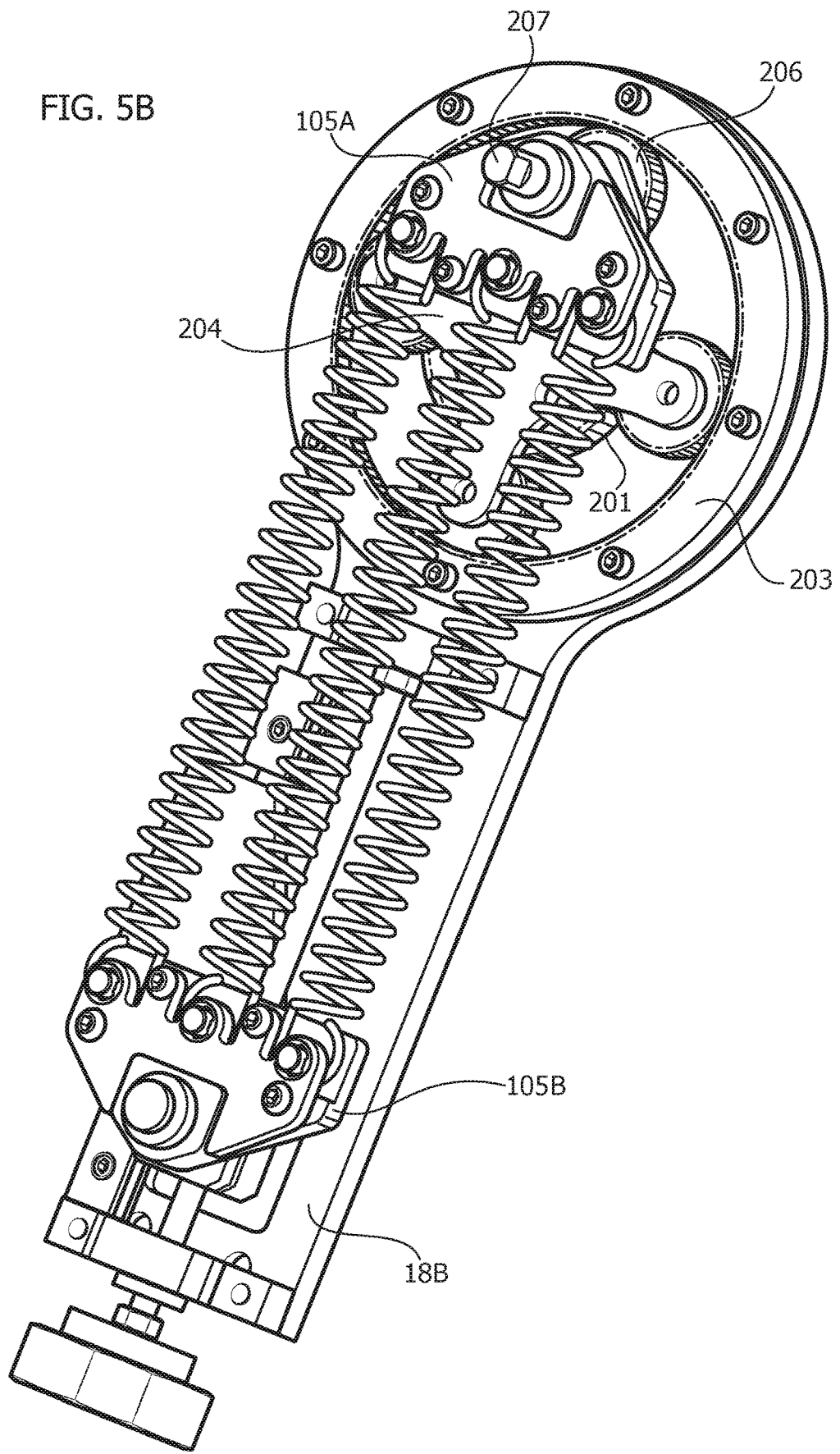
FIG. 5B illustrates internally, in an axonometric view, the compensation device of the system of FIG. 1 according to a further embodiment.

FIGS. 5A and 5B illustrate two embodiments of this device.

Referring to FIG. 5A, the compensation device illustrated comprises a first rotatable member 101, such as a first gear wheel, which is carried by the end 182 of the element 18A, fixed thereon and having its own axis aligned with the axis of rotation I3. A second rotatable member 103, such as a second gear wheel, is rotatably mounted on the element 18B, about its own axis I4, parallel to the axis of rotation I3, and is arranged so it engages the first gear wheel 101. In operation, rotation of the element 18B about the axis of rotation I3 will hence determine a motion of rotation of the second gear wheel 103 about its own axis I4 and a motion of revolution made by the first gear wheel itself about the axis of rotation I3.

To return to the constructional configuration of the compensation device, this further comprises an elastic mechanism 105, preferably equipped with a plurality of elastic mechanisms, which exerts a linear elastic force on an eccentric point of the second gear wheel 103. In various preferred embodiments, as in the one illustrated, the assembly 105 has two opposed brackets 105A and 105B, the former fixed to the second gear wheel 103 on a fixing point 107 in an eccentric position, and the latter carried, instead, by the element 18B. Anchored to the two brackets 105A and 105B are the respective opposite ends of an elastic element of the elastic mechanism 105, which may be battery of helical springs, operating in tension. The overall action of the above springs determines a linear resultant force F applied on the fixing point 107 (see FIGS. 6A-6C). As an alternative to the helical springs, the device may envisage elastic elements of some other type, for example one or more elements made of elastomeric material, with the main advantage of being lighter.

Figure 2:
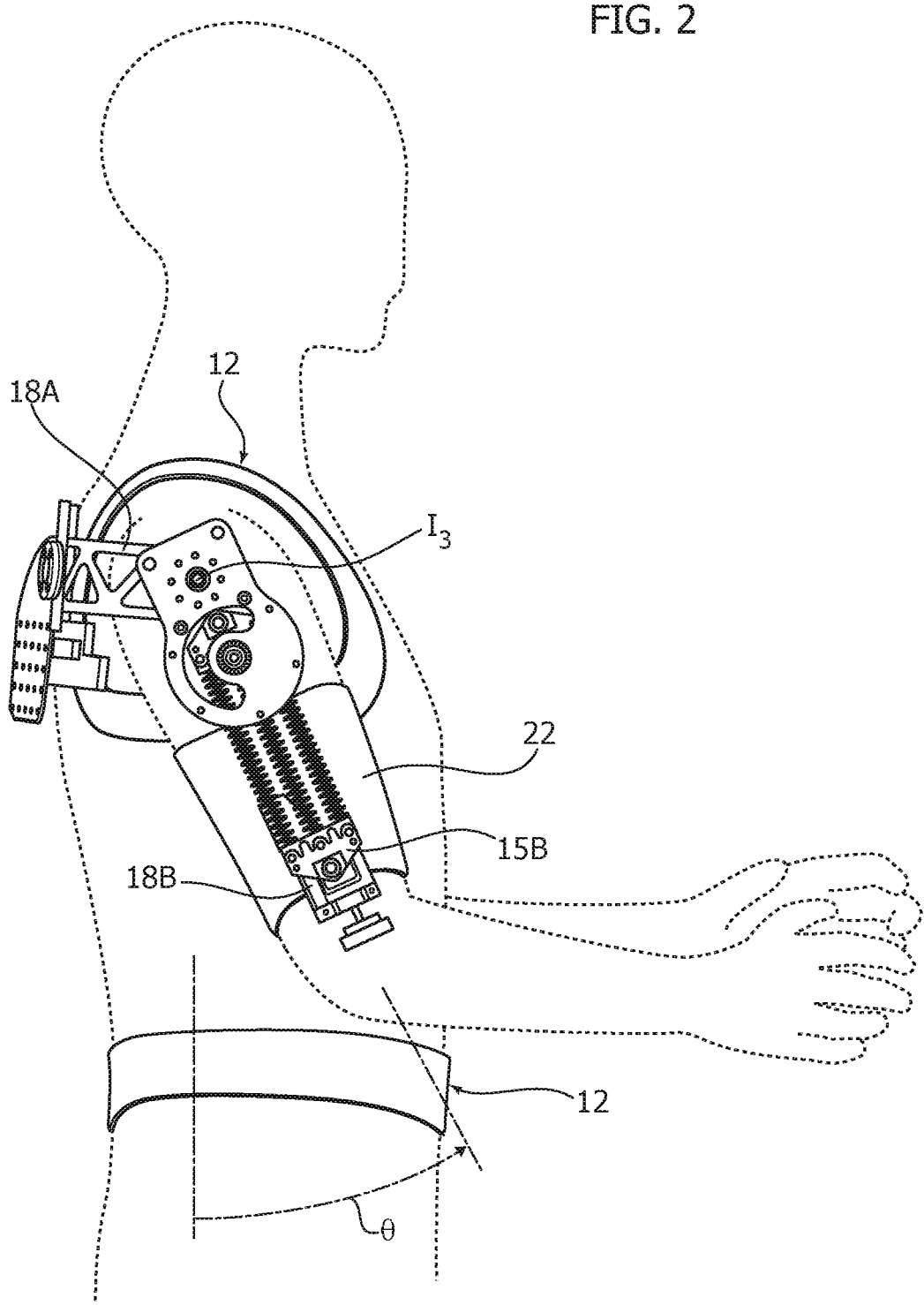
FIG. 2 illustrates the system of FIG. 1 according to a lateral view.
Figure 3:
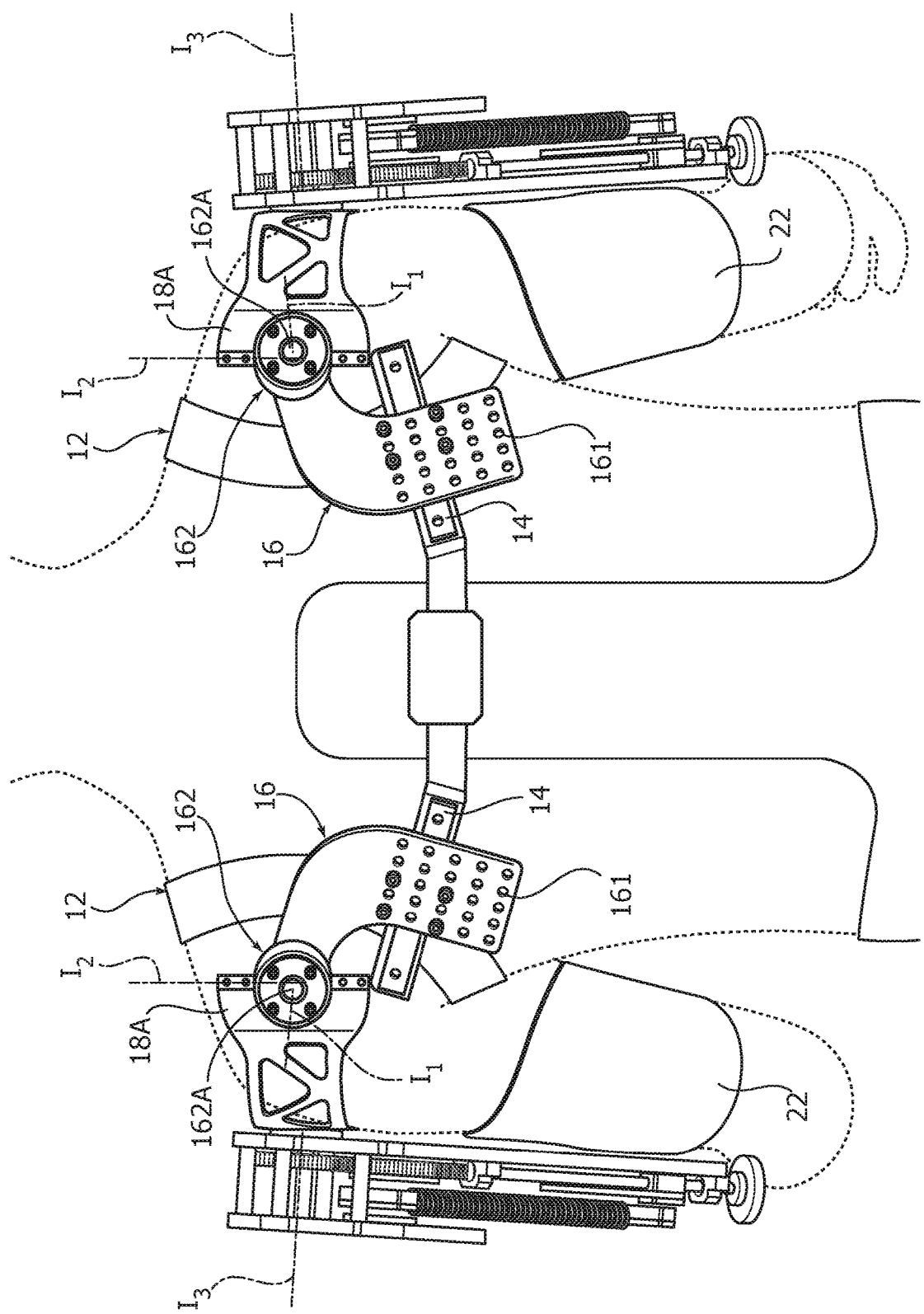
FIG. 3 illustrates the system of FIG. 1 according to a rear view.
Figure 4:
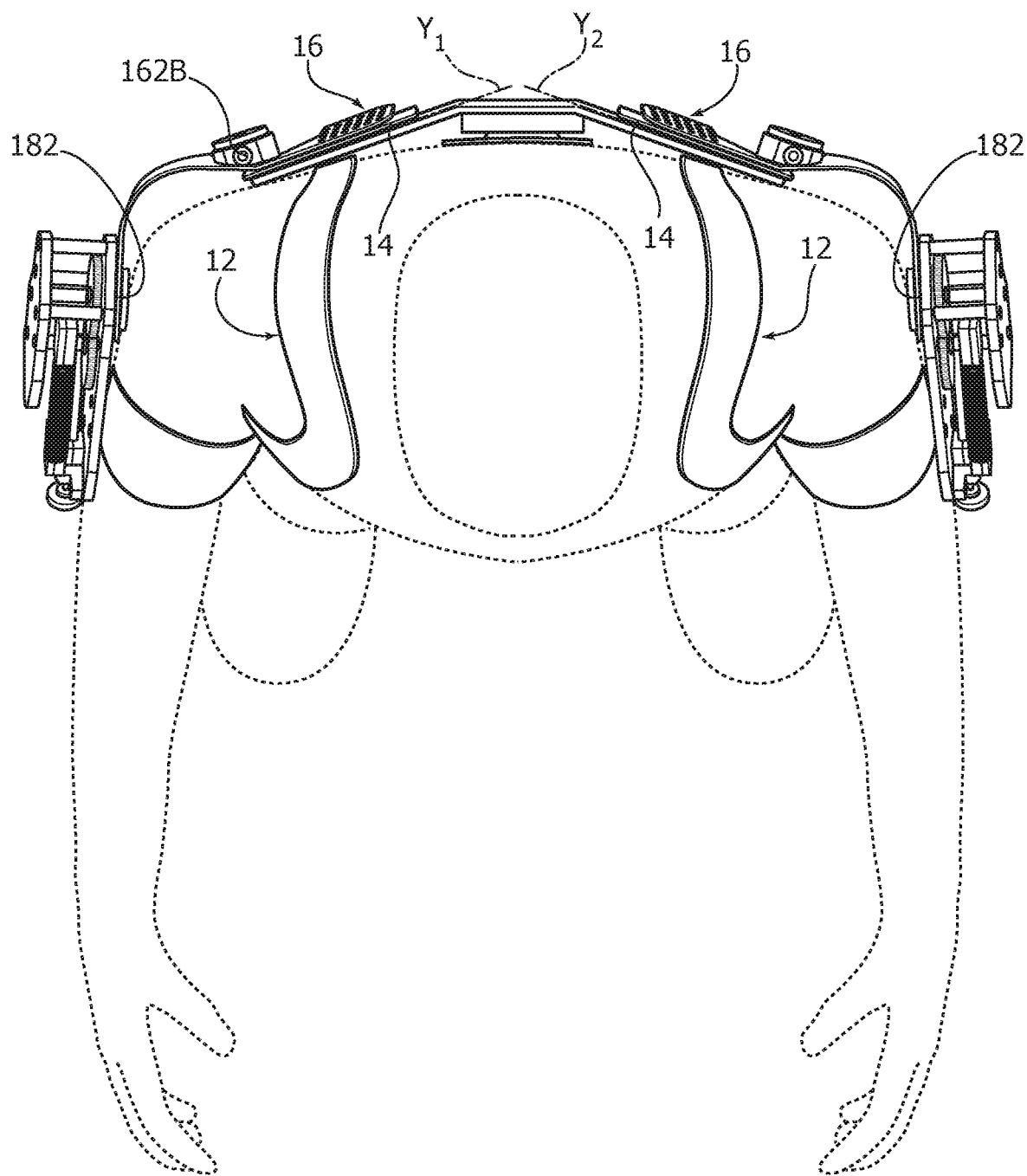
FIG. 4 illustrates the system of FIG. 1 according to a top plan view.

It should now be noted that the amplitude of the force F and its vector on the fixing point 107 both vary as a function of the angle of rotation of the second gear wheel 103 about its own axis I4, and hence in ultimate analysis as a function of the angle of rotation of the element 18B about the axis of rotation I3; in the figures, this angle is denoted by the reference Θ (FIG. 2).

For each angular position, the value of the force and the tangential component Ft of its vector will determine the degree of the assistance provided by the compensation device for the movement of forward projection of the arm.

Figure 6A:
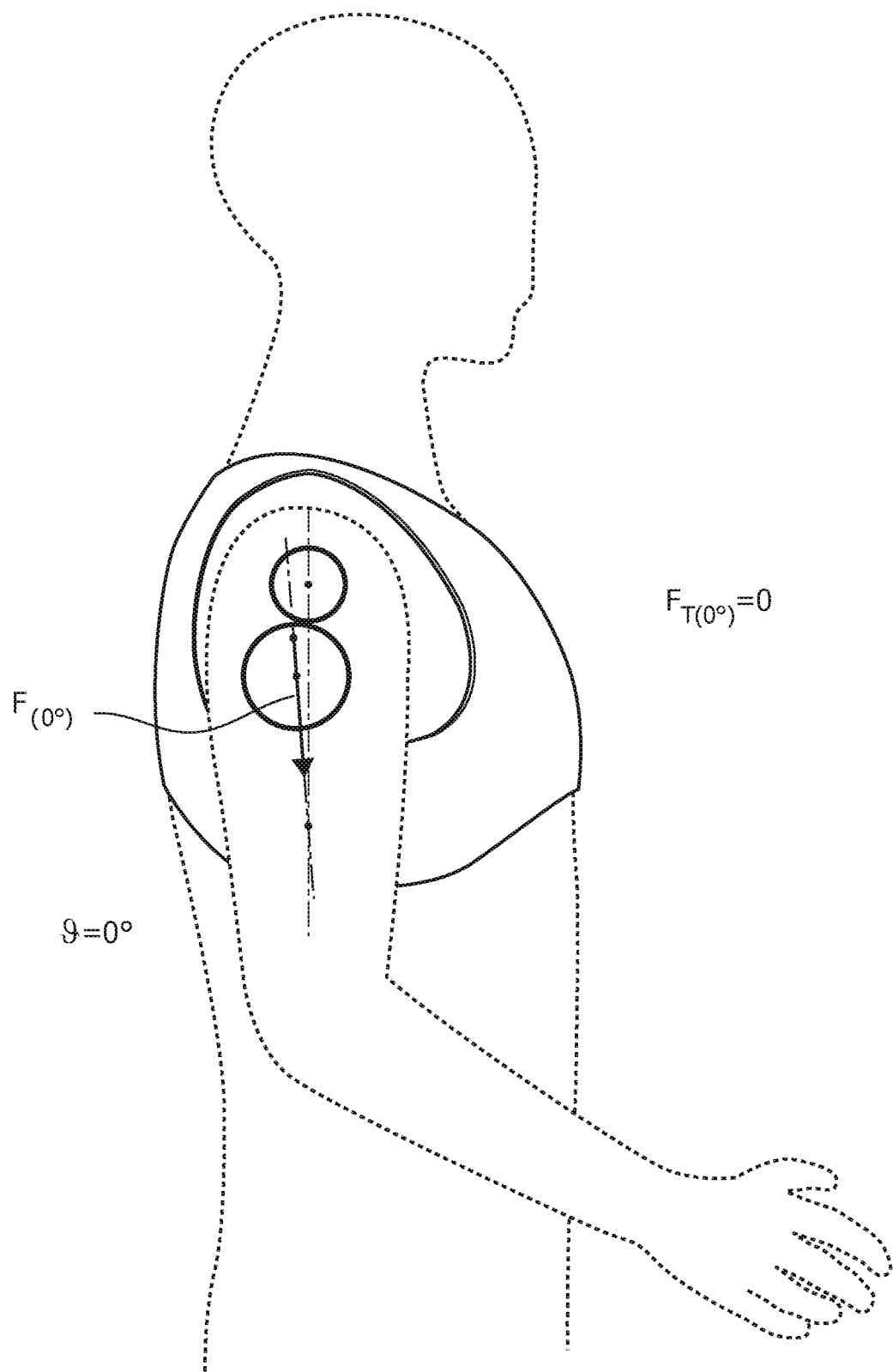
FIGS. 6A-6C illustrate diagrams provided by way of example of operation of the compensation device described.
Figure 6B:
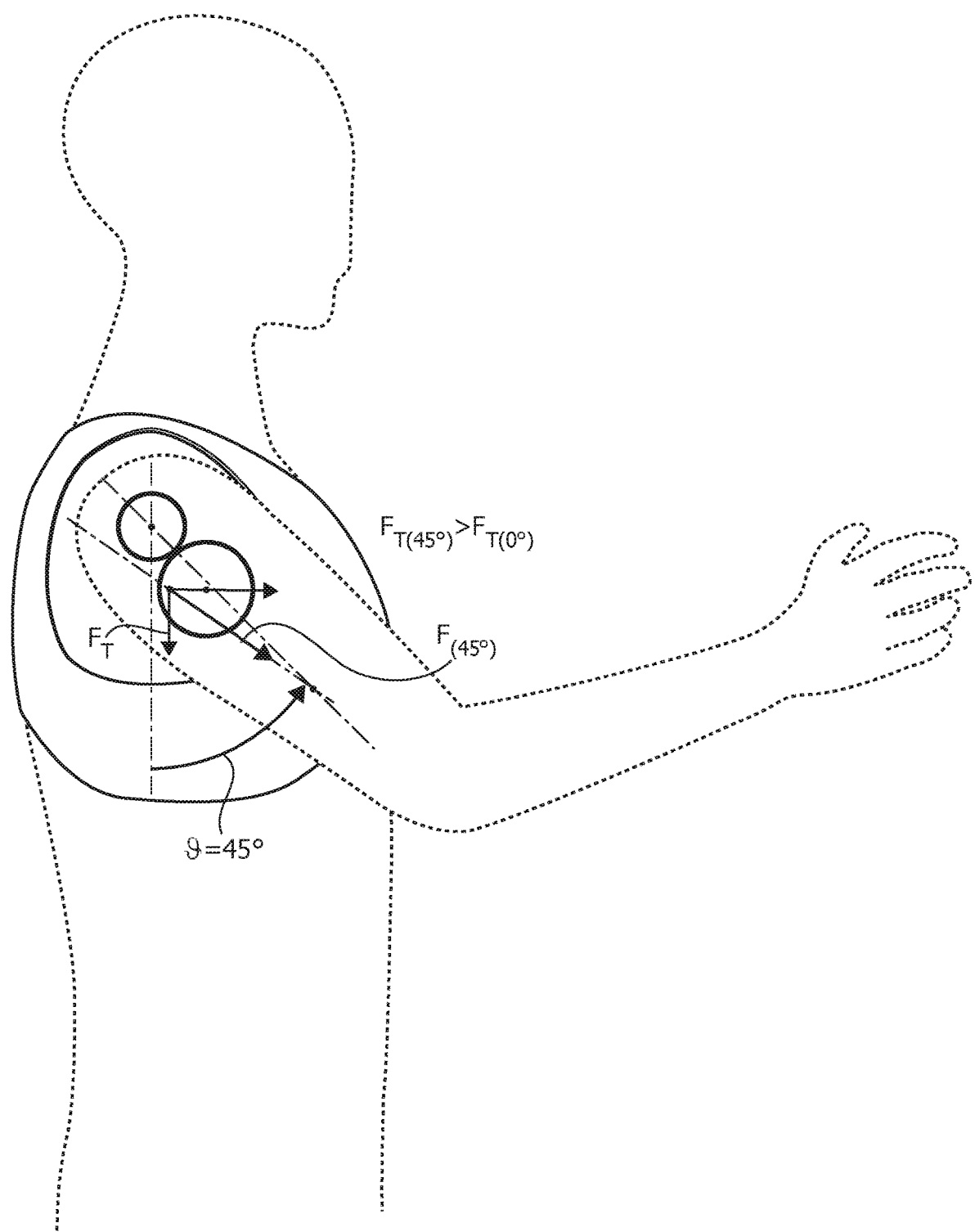
Figure 6C:
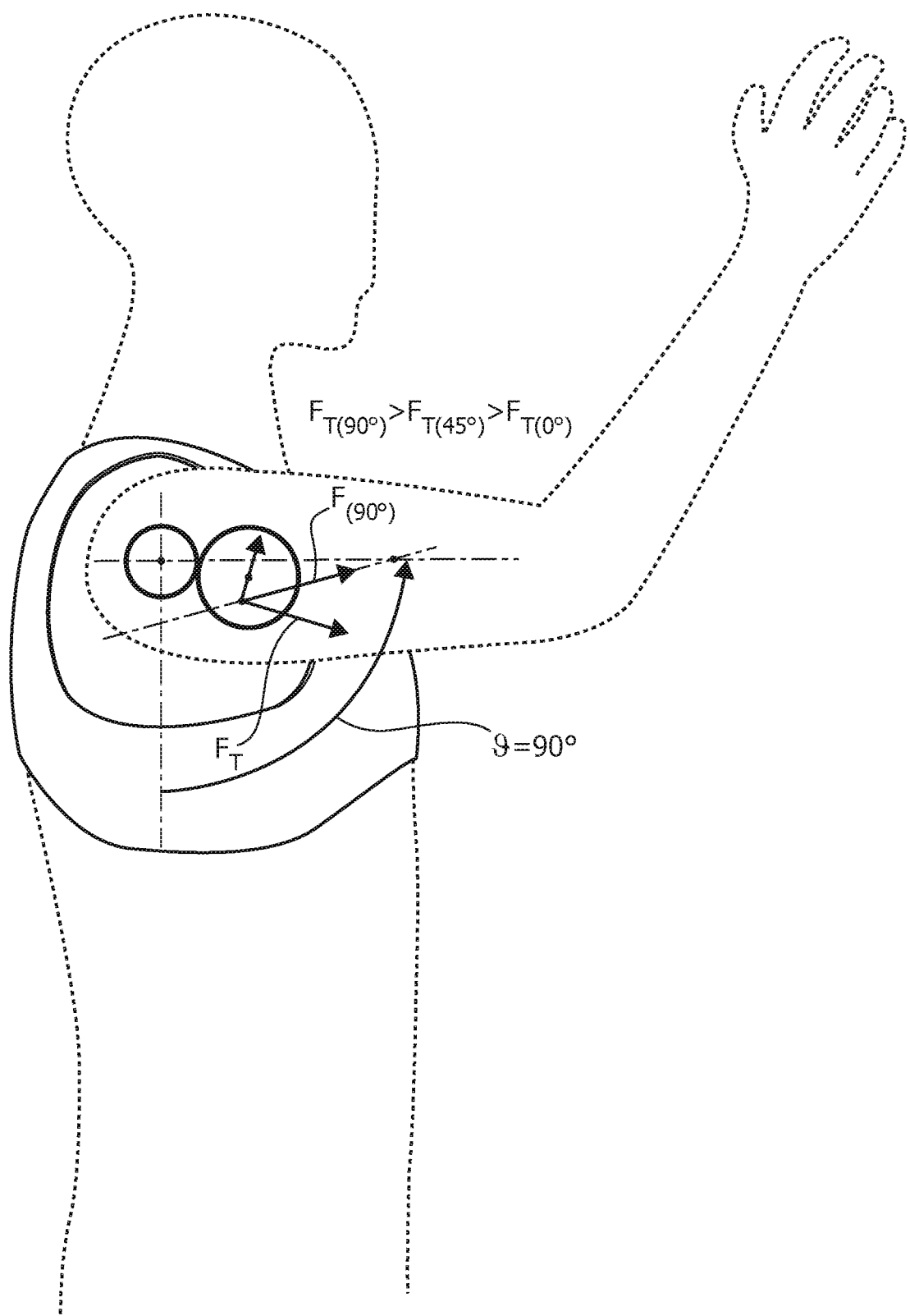

FIGS. 6A-6C illustrate in a schematic way how the above quantities vary as the angle of rotation varies.

In the light of what has been described above, it will now be clear to the person skilled in the sector that, by selecting the transmission ratio between the first and second gear wheels 101 and 103, it is possible to establish different assistance curves.

Figure 7:
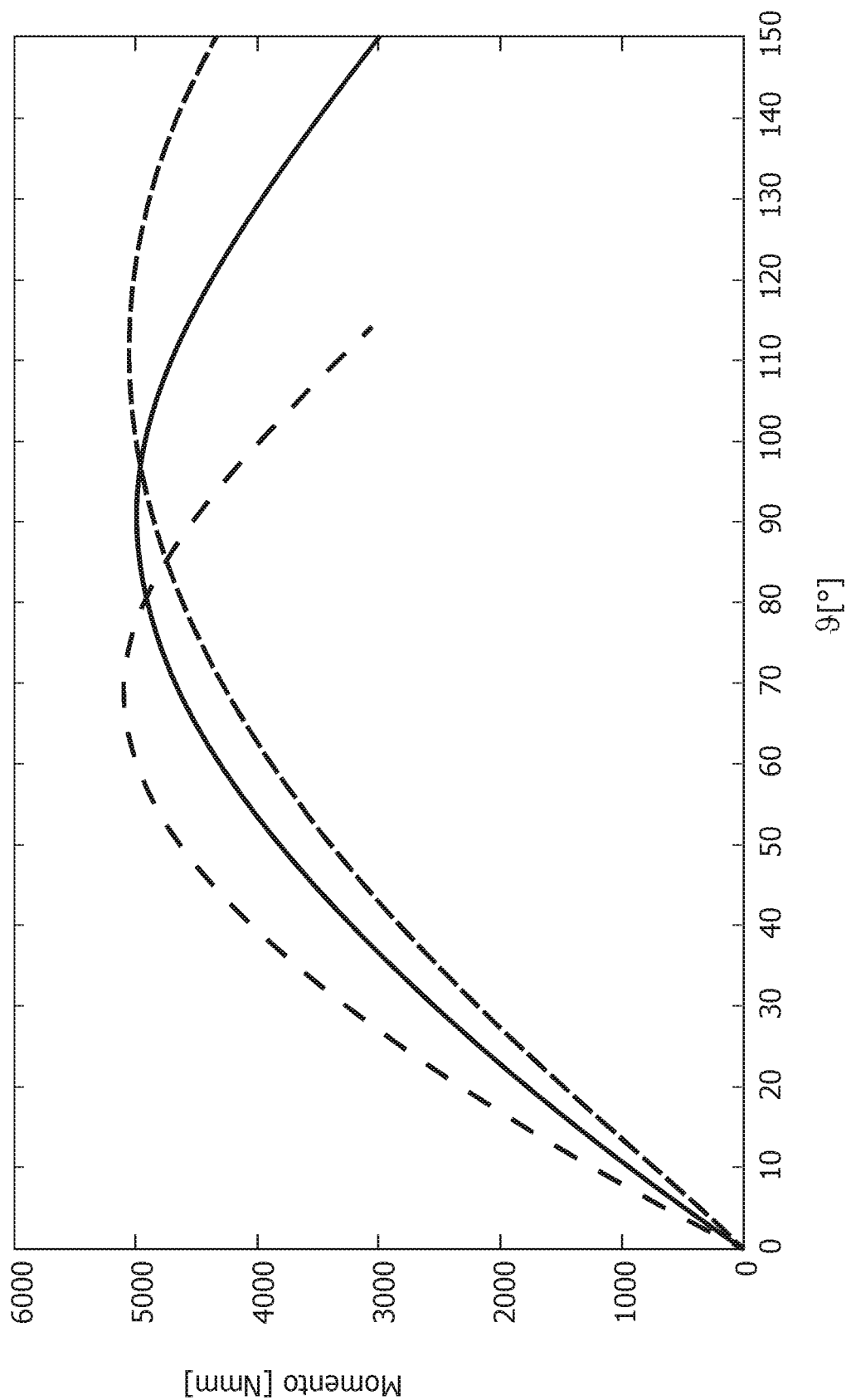
FIG. 7 illustrates various examples of curves of the assisting torque that can be supplied by the system.

FIG. 7 illustrates various examples of the curve of the assistance torque, which is a function of the angle of rotation, that can be supplied by the system 10 for different transmission ratios of the gearing of the compensation device.

As seen in FIG. 7, by increasing the transmission ratio, the maximum of the curve is shifted towards higher angles of rotation.

Figure 10:
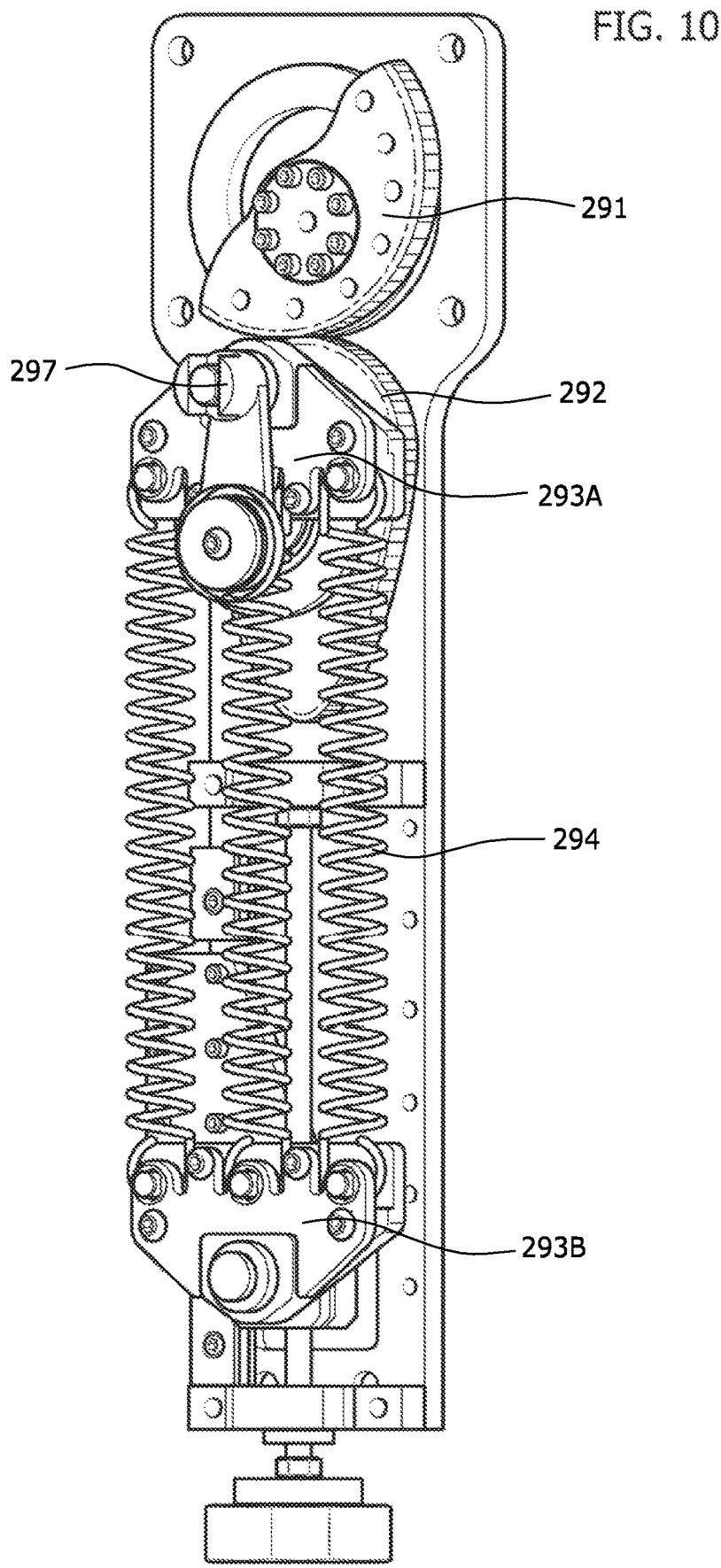
FIG. 10 illustrates internally the compensation device of the system of FIG. 1 according to yet a further embodiment.
Figure 11:
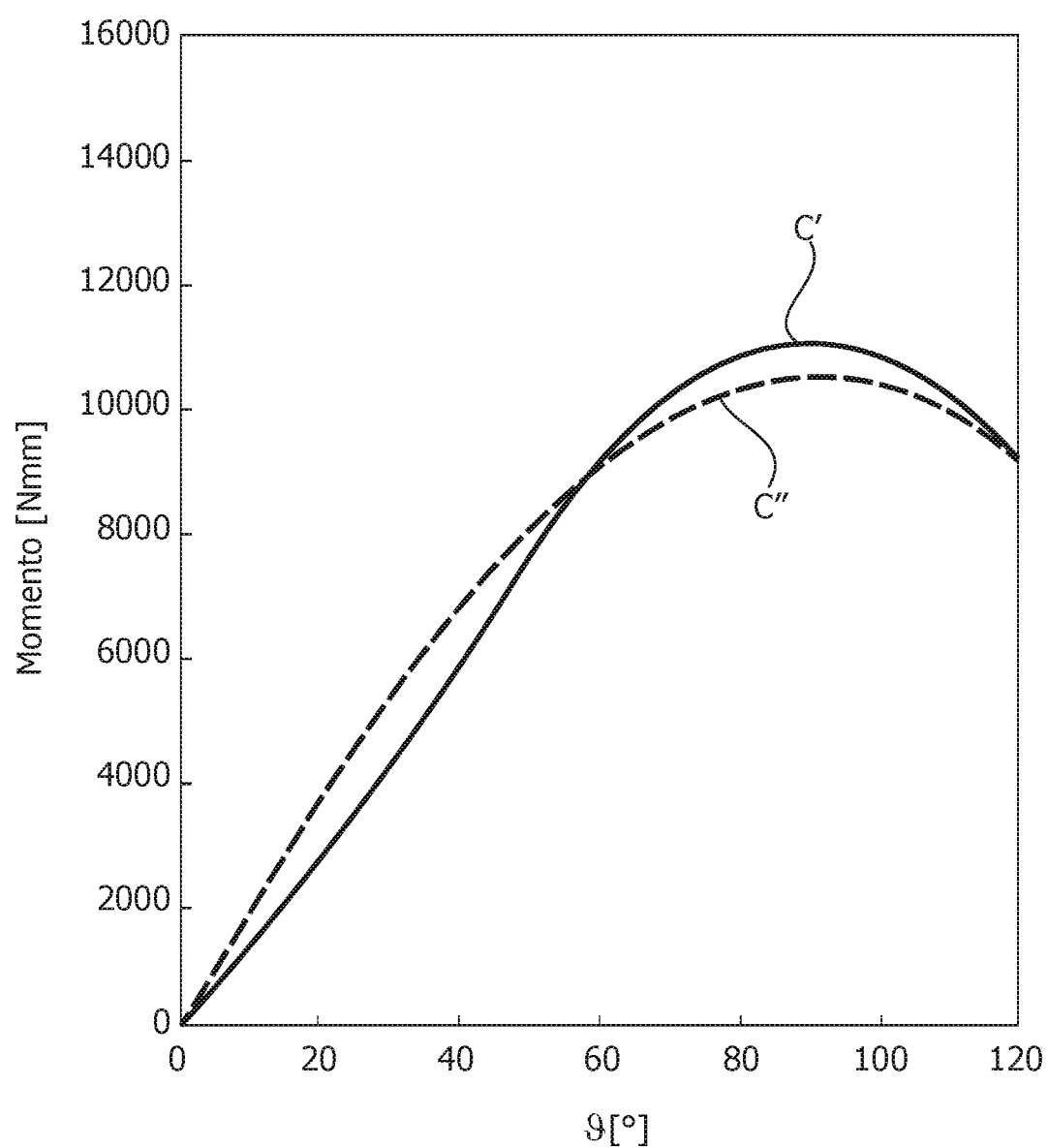
FIG. 11 illustrates a further example of curve of the assisting torque that can be supplied by the system.

It is also possible to envisage the use of non-circular gear wheels, with variable transmission ratios, the purpose of this being to modify the profile of the assistance curve in the perspective of obtaining given levels of performance. In various embodiments, there may be envisaged a transmission ratio that increases as the angle of rotation increases to obtain, regarding embodiments with constant transmission ratio, a reduction of the assisting torque for narrow angles (close to zero) and, instead, an increase of the assisting torque where there is the maximum of the curve. FIG. 11 illustrates the assistance curve, designated by C', generated by a compensation device equipped with gear wheels with increasing transmission ratio, and the assistance curve, designated by C'', generated, instead, by a device provided with elastic means that can define the same elastic force but have a gearing with constant transmission ratio. FIG. 10 represents an example of this device equipped with gear wheels with an increasing transmission ratio. Non-circular gear wheel 291 engages second gear wheel 292, generating as a result of the non-circular shape a variable transmission ratio. First and second opposed brackets 293A, 293B define therebetween an elastic mechanism 294, similar to previous embodiments, with first bracket 293A attaching to the second gear wheel 292 at a fixing point 297.

The system can be easily prearranged for determining pre-set curves optimized for the specific requirements of the applications.

Regarding assistance to the movement of antero-projection of the arm, the system is suited for providing the best assistance if the maximum torque available is generated at an angle of rotation of 90°, for this is the most unfavorable condition regarding the gravitational moment acting on the arm itself.

As discussed above, the system is prearranged so the assistance torque supplied is zero in at least one predefined position, a position that comes to constitute a neutral position of the system. In the embodiment illustrated, this neutral position corresponds to the position where the angle of rotation Θ is zero, as is immediately visible from FIG. 7, where the curve represented has a zero value of assistance torque for an angle Θ of 0°.

Referring to FIG. 6A, which represents the configuration of the compensation device at that neutral position, it may be seen that for this position the elastic force exerted by the elastic mechanism 105 on the gear wheel 103 is oriented in a direction incident regarding the axis of rotation of the gear wheel 103 itself. Incidentally, it should also be noted that, in this condition, the direction that joins the two centers of the gear wheels 101 and 103 and the direction of the vector of the elastic force remain offset regarding one another.

Once again to render the system adaptable to the various applications, and likewise versatile, in various preferred embodiments, as in the one illustrated, the elastic mechanism 105 is prearranged so the position of the bracket 105B regarding the opposed bracket 105A is adjustable, to allow the possibility for the operator of setting the pre-tensioning load of the springs. The elastic mechanism 105 envisages for this purpose an adjustment device of a screw-operated type, which can have either a manual command, as in the embodiment illustrated having a knob, or else an electromechanical command provided by one or more actuators which can be driven by a push button, the latter preferably being set in a position that can be reached easily by the operator even when wearing the system. The possibility of adjustment enables the operator both to set the desired level of assistance and, possibly, to exclude it altogether.

With reference now to the embodiment of FIG. 5B, the compensation device illustrated is characterized in that it provides not a simple gearing with two mutually coupling members, but rather an epicyclic gear train provided on the axis of rotation I3.

In various preferred embodiments, as in the one illustrated, the central or "sun" gear 201 of the gear train is fixedly carried by the end 182 of the element 18A, with its own axis aligned to the axis of rotation I3. The crown wheel 203 is mounted fixed on the element 18B, in a position coaxial regarding the gear wheel 201, being rotatable about the axis I3 itself.

A planetary-gear carrier 204 is rotatably mounted on the gear wheel 201, once again about the axis I3, carrying at the end of its arms the planet gears 206.

In operation, rotation of the element 18B about the axis of rotation I3 will determine rotation of the crown wheel 203 and of the planetary-gear carrier 204 about the axis I3, and the combined movement of rotation and revolution of the planet gears 206 about their own axis of rotation and about the axis I3.

In this embodiment, the elastic mechanism 105 is prearranged to exert a linear elastic force on an eccentric point 207 of the planetary-gear carrier 204; its bracket 105A is fixed on one of the arms of the latter.

As compared to the compensation device of FIG. 5A, the device just described is characterized in that it presents smaller overall dimensions and a lower weight while providing the same levels of performance and the same structural parameters.

The operating principle of this device is the same as the one mentioned above referring to the embodiment of FIG. 5A.

Also, the amplitude of the elastic force generated by the elastic mechanism 105 and its vector on the point of application 207 vary as a function of the angle of rotation of the gear wheel 203 about the axis of rotation I3 and hence as a function of the angle of rotation.

For each angular position, the value of the above force and the tangential component Ft of its vector will determine the amount of the assistance provided by the device regarding the movement of forward projection of the arm.

In addition, also in this embodiment, the device is prearranged so the assistance torque supplied is zero at at least one neutral position of the system. This will correspond to a position where the elastic force exerted by the elastic mechanism 105 on the planetary-gear carrier 204 is oriented in a direction incident regarding the axis of rotation I3.

Once again referring to the compensation device equipped with an epicyclic gear train, alternative embodiments may envisage that the crown wheel 203 is fixed to the element 18A and, instead, the central gear wheel 201 is fixed to the element 18B, according to a configuration opposite to the one illustrated.

With reference now to the axes of movement Y1, Y2, I1, and I2, the system does not exert any assistance torque about these axes, but simply thanks to these axes it can follow the joint movements out of the sagittal plane of the operator. The operator is hence not constrained in any specific posture or position and can, instead, assume the posture that is most comfortable for himself for the task to be carried out, and in the position chosen will receive the assistance to the effort required, about the axis I3.

It should again be noted that the linear guide 14, besides assisting the possible movements of the shoulder with a component along the axes Y1, Y2, also enables the system to adapt to the build of the operator, the sliding-block assemblies 16 moving away from one another or towards one another according to the breadth of shoulders. The garment 12 may envisage fixing members such as belts, hook and loop fasteners, and etc., for adjustable closing thereof.

As anticipated above, the principles set forth can be identically reproduced to provide a system of assistance designed for use for other joint groups or other joints, for the hip joint or alternatively the knee joint.

Figure 8:
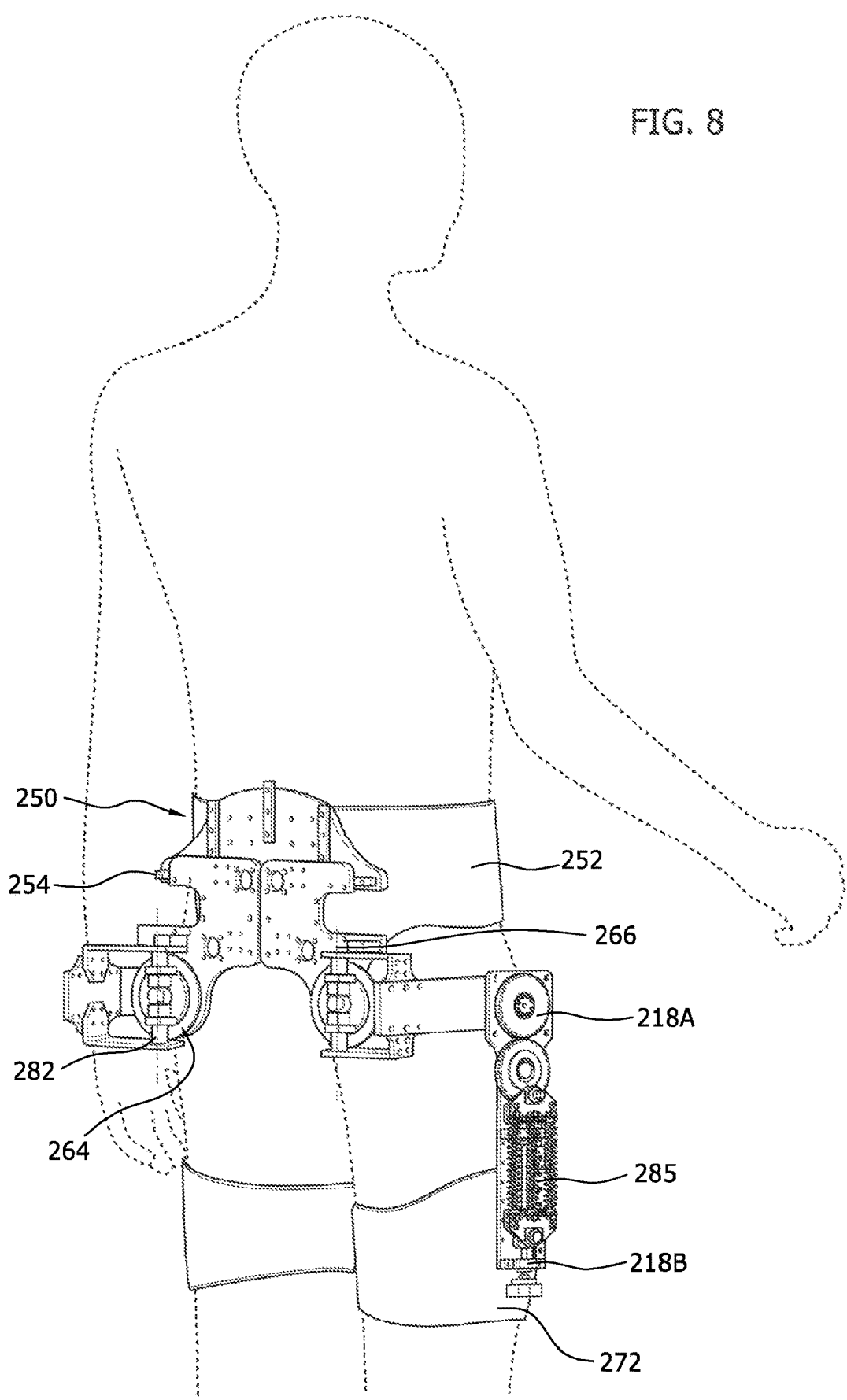
FIG. 8 illustrates an embodiment of the system in perspective view described herein for application to the hip joint.

FIG. 8 illustrates an example of a system of assistance for the hip joint. Here, the assistance supplied is exerted for the movement of bending of the thigh relative to the pelvis, or else to the movement of bending of the torso on the pelvis, according to the task carried out by the operator.

The neutral position discussed above corresponds in this case to the upright position of the operator.

The axes of movement of the above system and the compensation device correspond identically to those of the system described previously, clearly transposed onto the hip joint.

What changes is basically the garment worn by the operator, which in the system of FIG. 8 is constituted by a belt that girds the pelvis, which carries a linear guide 254 and two articulation elements 218A, and by two bands 272 worn on the thighs, to which the two articulation elements 218B are constrained. In particular, the embodiment of FIG. 8 shows a system 250 comprising a garment 252 and a mobile frame including a joint 282 arranged to adapt to an operator's dimensions and movements. Joint 282 comprises a rotatable annular body 264 that is rotatably mounted on the mobile frame and facilitates adduction and abduction of the operator's legs. System 250 further comprises a rod 266 facilitating inward and outward rotations of the hip, thus providing two degrees of freedom that are orthogonal to one another, as in the previously-described embodiment.

System 250 also comprises a compensation device 285 comprising an elastic mechanism as provided in the previously-described embodiment and configured to aid the operator in degrees of maintaining of upright position.

Figure 9:
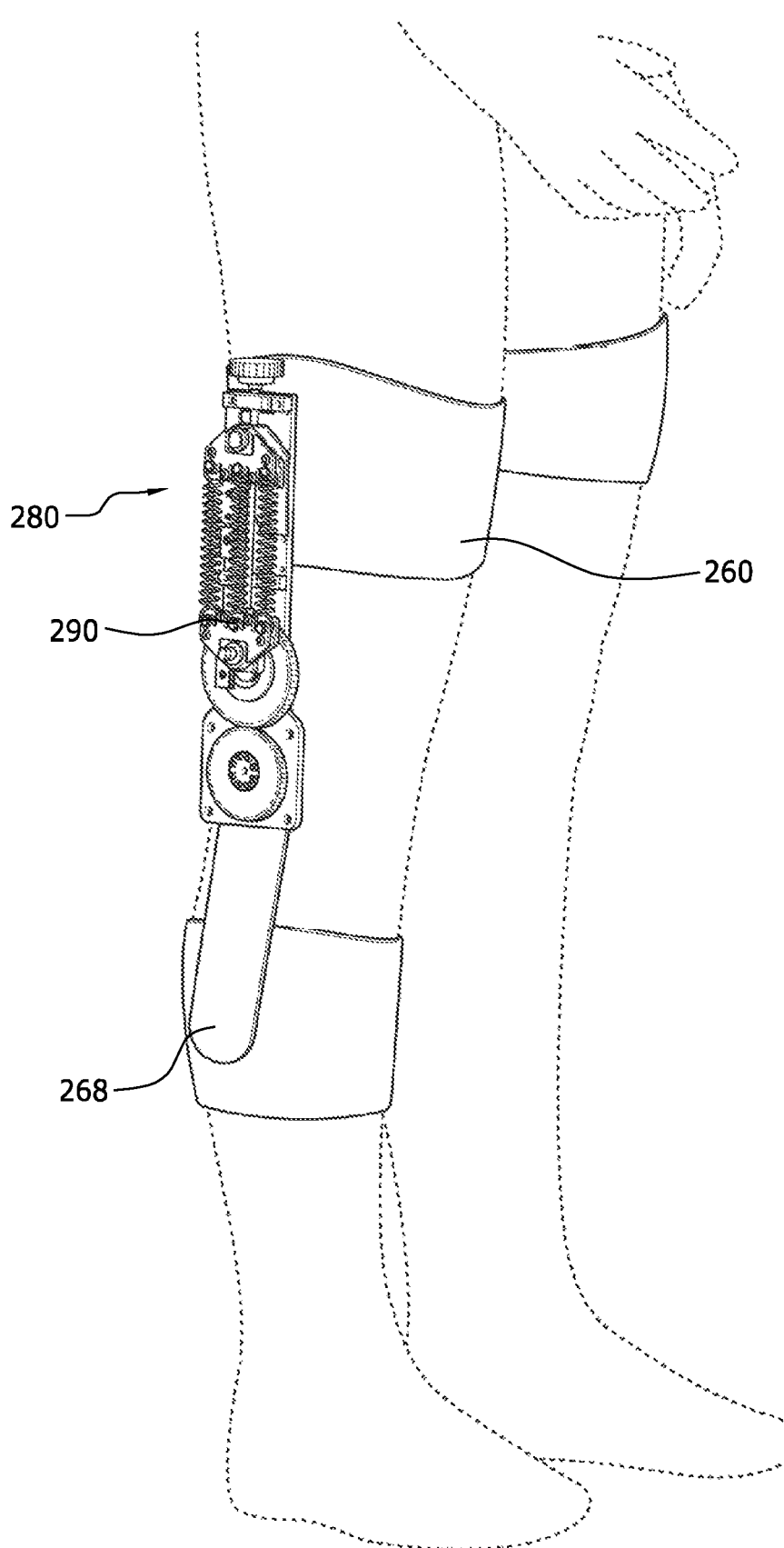
FIG. 9 illustrates an embodiment of the system in perspective view described herein for application to the knee joint.

FIG. 9 illustrates, instead, an example of system 280 of assistance for the knee joint. Here, the wearable garment comprises two bands 260, 268, one worn at the level of the thigh and the other worn at the level of the calf. The system 280 likewise comprises a compensation device 290 that aids the operator in maintaining a desired degree of flexion and extension of the leg.

Figure 12:
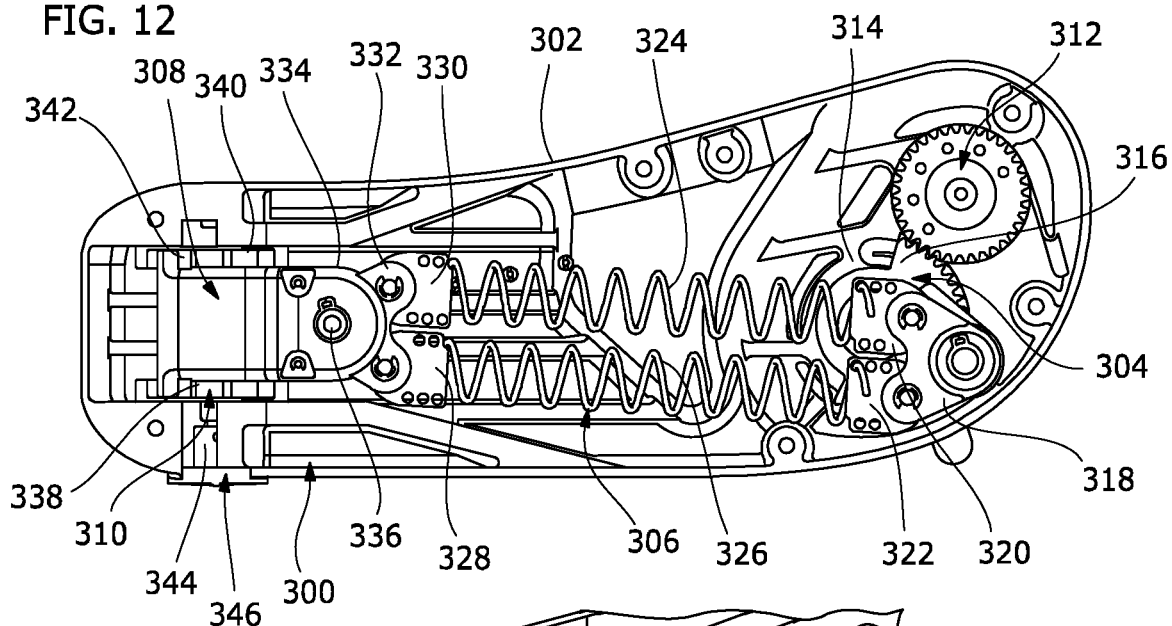
FIG. 12 illustrates another embodiment of a compensation device for the system of FIG. 1.

FIG. 12 shows another embodiment of a compensation device 300 based on a spring-based mechanism generating torque proportional to an elevation angle of a user's arm, as in foregoing embodiments. As with the foregoing embodiments the compensation device is arranged to generate torque proportional to the elevation angle of a user's arm. Advantageously, this embodiment provides a pretension system that enables a user to adjust the extent of the pretension in a simplified and quick manner, with a plurality of predetermined settings.

Referring to the compensation device embodiments of FIGS. 5A and 5B, a tension regulation mechanism 150 is located at a second or lower end of the compensation device 100, 200. The tension regulation mechanism 150 comprises an interface mechanism 152, such as a dial 152, arranged to actuate a rod or screw mechanism 154 to lengthen or shorten the second bracket 105B relative to the first bracket 105A. A mount 156 for the second bracket 105B may be connected to and movable according to displacement of the rod 154 according to adjustment of the dial 152. Tension is adjusted by setting the distance between the two extremities of the elastic mechanism 105, varying a distance between first and second ends of the elastic mechanism 105.

Turning to FIG. 12, the compensation device 300 has a housing 302 in which features of the compensation device 300 are contained. These features of the compensation device 300 include a rotational assembly 304 adapted to connect to the articulated element 18A, an elastic mechanism 306 coupled to the gear assembly 304, and a tension regulation device 308 connected to and having a cam assembly 310 configured to modify tension in the elastic mechanism 306.

The gear assembly 304 includes a first rotatable member or shoulder gear 312 having a geared outer periphery 313 that meshes with a geared outer periphery 316 belonging to a second rotatable member or spring gear 314. The first rotatable member 312 is brought into relative motion about the axis of rotation I3 because of the movement of the joint of the operator's body, wherein the second rotatable member 314 can rotate about its own axis.

The second rotatable member 314 is coupled by a first bracket 318 to the elastic mechanism 306. The elastic mechanism 306 is shown as having first and second elastic elements 324, 326 in the form of helical springs, and secure to the first bracket 318 by at least one first mount 320, 322. The elastic mechanism 306 is arranged to exert a linear force on an eccentric point 323 on the first bracket 318.

The elastic mechanism 306 connects to a second bracket 332 by at least one second mount 328, 330. The second bracket 332 connects to the regulation device 308, such as with a central connection 336 on a slider 334.

The cam assembly 310 has at least one cam 338, 340 that is selectively engageable with a positional holder 342, such as a pin, extending from the slider 334. The at least one cam 338, 340 has a surface 341 defining at least two equilibrium points 350 defining predetermined tension settings of the elastic mechanism 306. The at least one cam 338, 340 may define first and second cams 338, 340 extending on first and second opposed sides of the slider 334 for engagement with the pin 342 that may likewise extend from opposed sides of the slider 334.

Figure 13A:
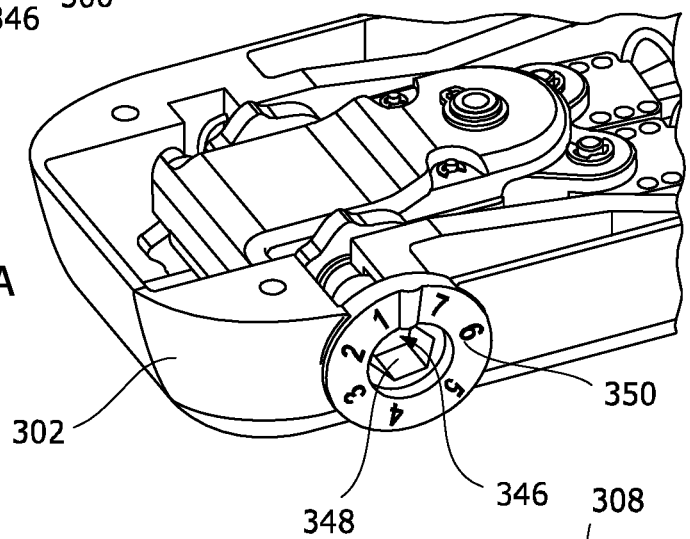
FIG. 13A illustrates an adjustment mechanism for the compensation device of FIG. 12.
Figure 13B:
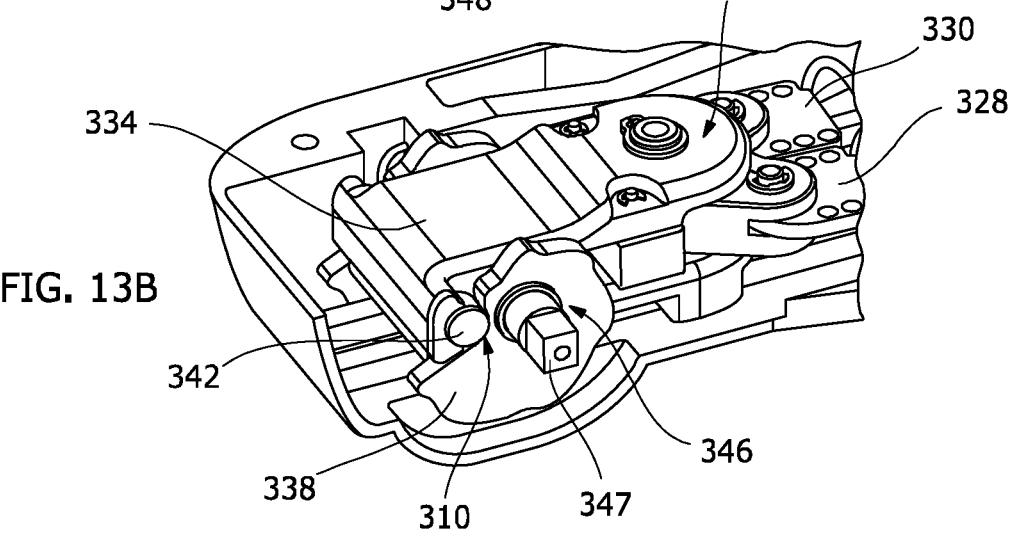
FIG. 13B illustrates the adjustment device of FIG. 13A without a measurement scale and exposes a cam assembly.

As represented in FIGS. 12 and 13B, the cam assembly 310 has an interface mechanism 344 for permitting a user to regulate the tension of the elastic mechanism 306 by adjusting the position of the cam assembly 310. The interface mechanism 344 may including a coupling part 346 securing to a boss 347 formed or connected to the at least one cam 338, 340. The interface mechanism 344 may further define a keyhole 348 for permitting insertion of a tool and regulation of the cam assembly 310 by turning the at least one cam 338, 340 to one of the predetermined settings.

FIG. 13A illustrates the housing 302, or otherwise disposed proximate the interface mechanism 344, as having indicia 349, such as in a regulation scale, for designating the predetermined settings afforded by the cam assembly 310. The keyhole 348 may be used in combination with a standard hexagonal key or customized tool to regulate the cam assembly 310.

Figure 14A:
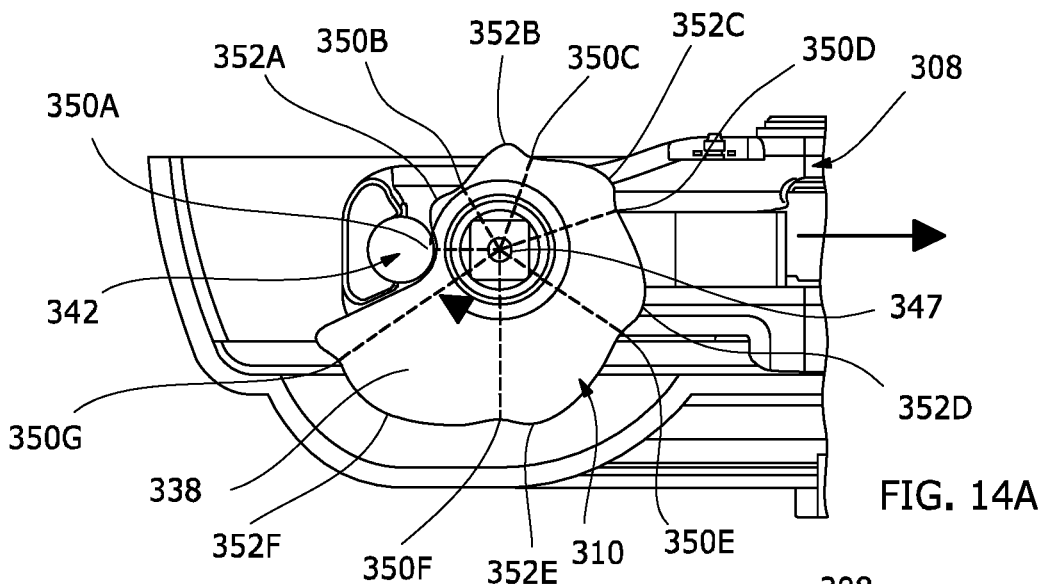
FIG. 14A illustrates the cam assembly of FIG. 12 and the settings thereof with the pin in a seated position.

FIG. 14A illustrates the first cam 338 as having depressions 350A-350G that create equilibrium points corresponding to the different assistance levels for the compensation device 300. Both the first and second cams 338, 340 may be rotationally connected to one another and adjust axially simultaneously, to engage the pin 342 at the same corresponding depression. Each depression 350A-350G sets a different distance between the cam axis A and the pin 342, as evidenced by the radial lines 352A-352G each having a different radius from another, and therefore set a different distance between the two spring extremities, such as measured by the first and second brackets. This arrangement causes a change of the elastic mechanism and offers different exoskeleton assistance.

Figure 14B:
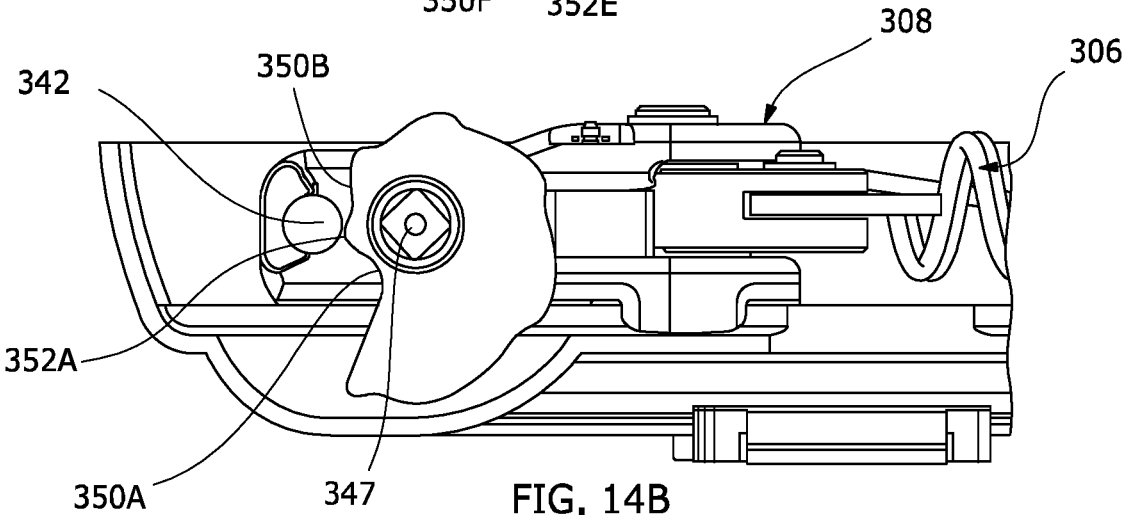
FIG. 14B illustrates the cam assembly of FIG. 14A in a transitional position.

FIG. 14A generally shows how the pin 342 is forced against the first cam 338 by tension in the elastic mechanism 306, and sits in equilibrium in the first cam depression 350A. Rotation of the cam assembly 310 requires an external torque to make the pin 'climb' out of the depression 350A. FIG. 14B shows how torque is applied to cam assembly 310 by the interface mechanism 344 which turns the cam assembly 310. The first cam 338 rotates until the pin 342 reaches the top of the of a regulation step 352A. As the first cam 338 is rotated, the pin 342 starts its fall into the second depression 350B. No more torque is needed. Once the pin 342 is in the second depression 350B, it is in equilibrium and will not rotate again unless an external torque is applied.

Figure 15A:
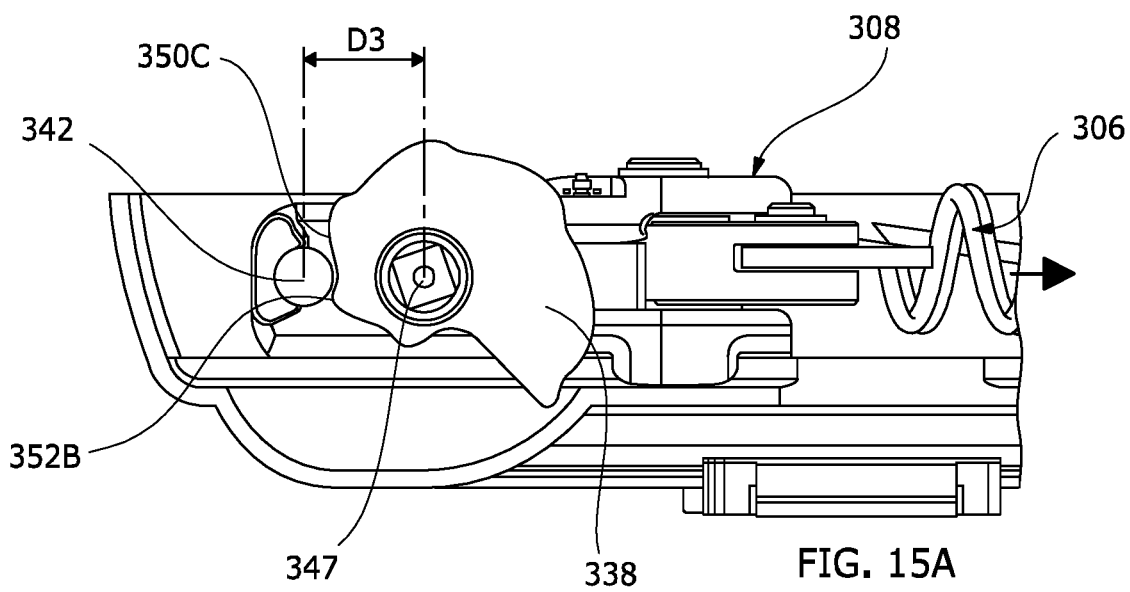
FIG. 15A illustrates the cam assembly of FIG. 14 in a third setting.
Figure 15B:
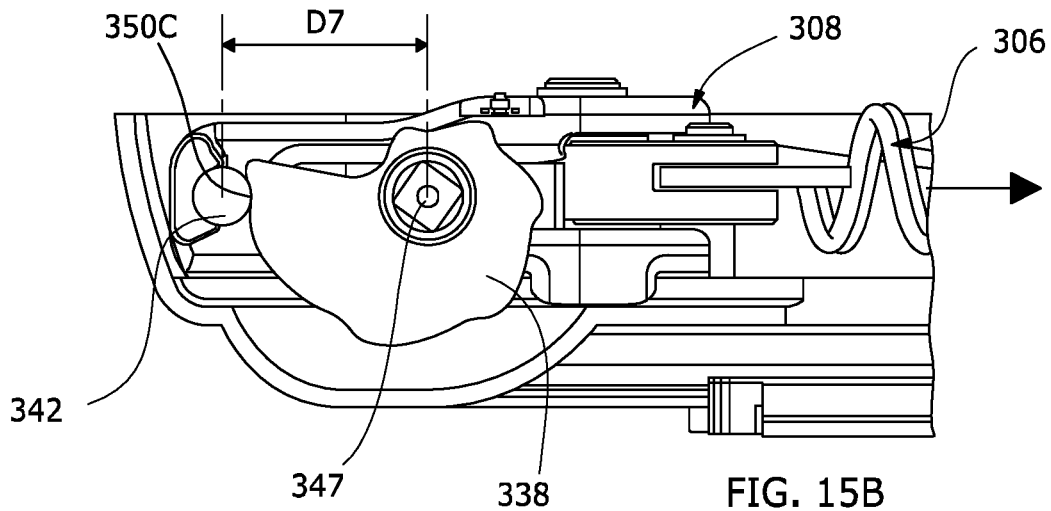
FIG. 15B illustrates the cam assembly of FIG. 14A in a seventh setting.
Figure 16A:
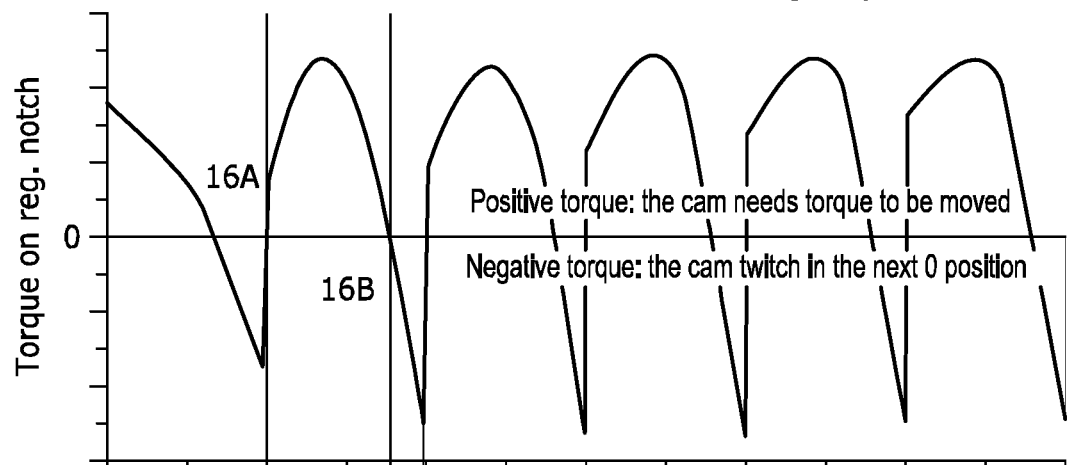
FIG. 16A illustrates a graph showing torque on a regulation position versus cam rotation angle.
Figure 16B:
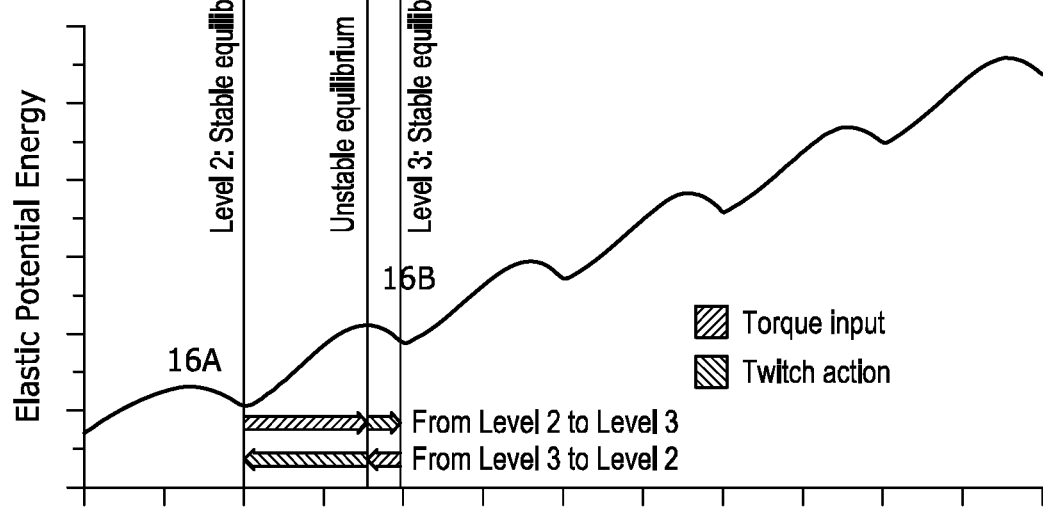
FIG. 16B illustrates a graph showing elastic potential energy versus cam rotation angle.

It will be understood that a torque must be applied to the interface mechanism 344 to force the at least one cam 338, 340 to leave an equilibrium point 350 and reach a different equilibrium stance at one of the other equilibrium points, as depicted in FIGS. 16A and 16B. FIG. 15A shows the pin 342 located in a third depression 350C, with radius of 354C from the axis A. FIG. 15B shows the pin 342 located in a seventh depression 350G, with a radius of 354G from the axis A. This happens because, in each working condition, at each regulation level, the elastic mechanism 306 is always tensioned and then the regulation device 308 is always forced against the cam assembly 310, creating a torque profile characterized by a sequence of 'valleys' (equilibrium points/depressions) and 'hills' (regulation steps).

FIG. 16A exemplifies the relationship of the torque interface mechanism on the cam rotation angle. The plots above the torque 0, represent positive torque needed to move the cam mechanism over a regulation step from equilibrium point (for example from equilibrium point 350A to equilibrium point 350B). The plots below the torque 0, represent negative torque used to move the cam mechanism past the regulation step into next equilibrium point.

FIG. 16B exemplifies the elastic potential energy from one equilibrium point according to the cam rotational angle to another equilibrium point. This may be from equilibrium point 350A to equilibrium point 350B.

Potential energy is accumulated or spent as the cam moves up or down 'hills' between adjacent stable equilibrium points/'valleys'. When moving either upward or downward (i.e., when either accumulating or spending potential energy), the cam first encounters an area requiring an input of torque in order to overcome the local minimum of potential energy, then the cam encounters an area in which the cam may 'twitch' into the adjacent position by 'rolling down' the slope into the adjacent stable equilibrium point/'valley'.

As seen in FIGS. 16A-16B, this is true even when the cam is net spending potential energy: the cam must first overcome the local minimum of potential energy by reaching a local maximum or 'hill' through the input of torque, and then may 'twitch' to come to rest in the adjacent 'valley' with an overall loss of potential energy. Input torque is also required to move the cam into an adjacent setting with a net gain in potential energy: as input torque moves the cam to an adjacent 'hill', the cam may then twitch to settle into the adjacent 'valley' with a higher potential energy than the previous 'valley'. This arrangement is advantageous as it requires a deliberate selection of the cam setting by the operator, rather than allowing the cam to spontaneously or accidentally switch between settings.

Without prejudice to the principle of the invention, the details of construction and the embodiments may vary, even significantly, regarding what has been illustrated purely by way of non-limiting example, without departing from the scope of the disclosure, as this is defined by the annexed claims.

The embodiments described herein provide a system for assisting an operator in exerting efforts that provides improved ergonomics and ease of use, particularly through the operation of the compensation device to provide adjustable and discrete amounts of torque to aid an operator in performing certain effortful motions.

The invention claimed is:

1. A system for assisting an operator in exerting efforts, the system comprising:

a garment arranged to be worn by the operator, which is to engage, when worn, the mutually mobile parts of a joint of the operator, and is equipped with a mobile frame that defines at least one axis of rotation, which is to assume a position corresponding to the joint of the operator; and a compensation device carried by the garment and operable to compensate resistive moments acting on the joint during the effort exerted by the operator, the compensation device comprising:

a first rotatable member and a second rotatable member, which are connected together and are brought into relative motion about a first axis of rotation as a result of movement of the joint of the operator, wherein the second rotatable member is arranged to rotate about a second axis of rotation;

an elastic mechanism having at least one elastic element, is arranged for acting on the second rotatable member to impart on the first axis of rotation a moment opposite to the resistive moments;

wherein the first and second rotatable members and the elastic mechanism are mutually prearranged in such a way that, in at least one pre-set position of the joint, the force exerted by the elastic mechanism on the second rotatable member is oriented in a direction incident with respect to the second axis of rotation of the second rotatable member;

wherein the mobile frame comprises a first portion and a second portion which are mutually mobile about the first axis of rotation;

wherein the first rotatable member is a first gear wheel, fixedly mounted on the first portion and aligned with the first axis of rotation;

wherein the second rotatable member is a gear wheel, fixedly mounted on the second portion, and rotatable about the second axis of rotation and mobile according to a motion of revolution about the second axis of rotation; and wherein the elastic mechanism engages the second rotatable member, exerting a linear force on an eccentric point of the second rotatable member.

2. The system according to claim 1, wherein the elastic mechanism comprises a battery of springs anchored at their first end to the eccentric point of the second rotatable member, and a second end is mounted on the second portion.

3. The system according to claim 2, wherein a position of the second end of the elastic mechanism with respect to the first end is adjustable for setting the pre-tensioning of the battery springs.

4. The system of claim 1, further comprising a tension regulation device connected and adapted to regulate tension in the elastic mechanism.

5. The system of claim 4, wherein the tension regulation device is arranged for pre-tensioning the elastic mechanism at a plurality of discrete tension settings and placing the pre-tension at one of the plurality of discrete tension settings.

6. The system of claim 4, wherein the tension regulation device includes a cam assembly for adjusting the elastic mechanism at a plurality of discrete tension settings.

7. The system of claim 4, wherein the tension regulation device further includes an interface mechanism for selectively adjusting the compensation device.

8. The system according to claim 1, wherein the system is designed for a shoulder joint of the operator, wherein the at least one pre-set position corresponds to a position of the arm extending along the operator's side.

9. The system according to claim 1, wherein the system is designed for a shoulder joint of the operator, wherein the first and second rotatable members define a motion-transmission ratio defined in that the elastic mechanism determines on the first axis of rotation a maximum moment in the position of the arm projected forwards at 90°.

10. The system according to claim 1, wherein the first and second rotatable members have a transmission ratio that is variable as a function of an angle of rotation about the first axis of rotation.

11. The system according to claim 1, in particular designed for the shoulder joint of the operator, wherein the garment comprises:

a portion designed to engage the torso of the operator, and has a linear guide on which a sliding-block assembly slides;

a first articulation element, rotatably mounted on the sliding-block assembly, about the second axis of rotation; and a second articulation element, which is rotatably mounted on the first articulation element, about the first axis of rotation.

12. The system according to claim 11, wherein the first articulation element is connected to the sliding-block assembly through a joint with two degrees of freedom, which defines a third axis of rotation and a fourth axis of rotation, orthogonal to one another.

13. The system according to claim 1, wherein the system is designed for the hip joint of the operator, wherein the pre-set position corresponds to an upright position of the operator.

14. A system for assisting an operator in exerting efforts, the system comprising:

a garment arranged to be worn by the operator;

a mobile frame attached to the garment; and a compensation device carried by the garment and operable to compensate resistive moments acting on the joint during the effort exerted by the operator, the compensation device comprising:

a first rotatable member and a second rotatable member, which are connected together and are brought into relative motion about a first axis of rotation as a result of the movement of the joint of the operator's body, wherein the second rotatable member is arranged to rotate about a second axis of rotation;

an elastic mechanism having at least one elastic element, is arranged for acting on the second rotatable member to impart on the first axis of rotation a moment opposite to the resistive moments;

wherein the first and second rotatable members and the elastic mechanism are mutually prearranged in such a way that, in at least one pre-set position of the joint, the force exerted by the elastic mechanism on the second rotatable member is oriented in a direction incident with respect to the second axis of rotation of the second rotatable member;

wherein the mobile frame comprises a first portion and a second portion which are mutually mobile about the first axis of rotation;

wherein the first rotatable member is a first gear wheel, fixedly mounted on the first portion and aligned with the first axis of rotation;

wherein the second rotatable member is a gear wheel, fixedly mounted on the second portion, and rotatable about the second axis of rotation and mobile according to a motion of revolution about the second axis of rotation; and wherein the elastic mechanism engages the second rotatable member, exerting a linear force on an eccentric point of the second rotatable member.

15. The system of claim 14, further comprising a tension regulation device connected and adapted to regulate tension in the elastic mechanism.

16. The system of claim 15, wherein the tension regulation device is arranged for pre-tensioning the elastic mechanism at a plurality of discrete tension settings and placing the pre-tension at one of the plurality of discrete tension settings.

17. The system of claim 15, wherein the tension regulation device includes a cam assembly for adjusting the elastic mechanism at a plurality of discrete tension settings.

18. A system for assisting an operator in exerting efforts, the system comprising:
- a garment arranged to be worn by the operator, which is to engage, when worn, the mutually mobile parts of a joint of the operator, and is equipped with a mobile frame that defines at least one axis of rotation, which is to assume a position corresponding to the joint of the operator; and
- a compensation device carried by the garment and operable to compensate resistive moments acting on the joint during the effort exerted by the operator, the compensation device comprising:
- a first rotatable member and a second rotatable member, which are connected together and are brought into relative motion about a first axis of rotation as a result of movement of the joint of the operator, wherein the second rotatable member is arranged to rotate about a second axis of rotation;
- an elastic mechanism having at least one elastic element, is arranged for acting on the second rotatable member to impart on the first axis of rotation a moment opposite to the resistive moments;
- wherein the first and second rotatable members and the elastic mechanism are mutually prearranged in such a way that, in at least one pre-set position of the joint, the force exerted by the elastic mechanism on the second rotatable member is oriented in a direction incident with respect to the second axis of rotation of the second rotatable member;
- wherein the mobile frame comprises a first portion and a second portion, which are mutually mobile about the first axis of rotation;
- wherein the compensation device includes an epicyclic gear train mounted at the first axis of rotation and prearranged so that a crown wheel of the epicyclic gear train is fixedly mounted on the second portion and a central gear wheel of the epicyclic gear train is fixedly mounted on the first portion, or vice versa, the crown wheel or central gear wheel defining the first rotatable member or a third gear member; and
- wherein the second rotatable member includes a planetary-gear carrier wherein the elastic mechanism engages the planetary-gear carrier, exerting a linear force on an eccentric point thereof.

* * * * *